United States Patent
Ellis et al.

(10) Patent No.: US 9,774,897 B2
(45) Date of Patent: *Sep. 26, 2017

(54) SYSTEMS AND METHODS FOR PROVIDING BLACKOUT SUPPORT IN VIDEO MOSAIC ENVIRONMENTS

(71) Applicant: Rovi Guides, Inc., San Carlos, CA (US)

(72) Inventors: Michael D. Ellis, Boulder, CO (US); Jon P. Radloff, Castle Rock, CO (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/182,067

(22) Filed: Jun. 14, 2016

(65) Prior Publication Data

US 2016/0295261 A1    Oct. 6, 2016

Related U.S. Application Data

(63) Continuation of application No. 14/701,922, filed on May 1, 2015, now Pat. No. 9,380,340, which is a (Continued)

(51) Int. Cl.
*H04N 21/258* (2011.01)
*H04N 5/445* (2011.01)
(Continued)

(52) U.S. Cl.
CPC ... *H04N 21/25808* (2013.01); *H04N 5/44591* (2013.01); *H04N 7/163* (2013.01); *H04N 7/17318* (2013.01); *H04N 21/2362* (2013.01); *H04N 21/25841* (2013.01); *H04N 21/432* (2013.01); *H04N 21/4438* (2013.01); *H04N 21/4622* (2013.01); *H04N 21/4722* (2013.01);
(Continued)

(58) Field of Classification Search
CPC ............. H04N 21/4532; H04N 21/454; H04N 21/4542; H04N 7/163
See application file for complete search history.

(56) References Cited

U.S. PATENT DOCUMENTS

| 7,370,343 | B1 * | 5/2008 | Ellis | H04N 5/44543 348/E5.105 |
| 7,530,085 | B2 * | 5/2009 | Tsuria | H04N 7/165 725/25 |

(Continued)

*Primary Examiner* — Benjamin R Bruckart
*Assistant Examiner* — Anthony Bantamoi
(74) *Attorney, Agent, or Firm* — Haley Guiliano LLP

(57) ABSTRACT

Systems and methods for providing blackout support in video mosaic environments are disclosed. In response to receiving a request for a video mosaic page, screen data, which may include blackout information, is received. The screen data identifies the video assets in the video mosaic page. A determination is made, based at least in part on the screen data, whether any video assets in the video mosaic page should be blacked out. Blacked out assets may be masked and their associated audio blocked. In addition, an overlay of options associated with the blacked out asset may be presented. The overlay may include options to substitute the blacked out asset with replacement content, search for similar content, or retrieve more information about the blackout.

20 Claims, 15 Drawing Sheets

Related U.S. Application Data continuation of application No. 11/510,363, filed on Aug. 24, 2006, now Pat. No. 9,032,430.

(51) Int. Cl.
| | |
|---|---|
| *H04N 7/16* | (2011.01) |
| *H04N 7/173* | (2011.01) |
| *H04N 21/2362* | (2011.01) |
| *H04N 21/443* | (2011.01) |
| *H04N 21/462* | (2011.01) |
| *H04N 21/4722* | (2011.01) |
| *H04N 21/482* | (2011.01) |
| *H04N 21/6543* | (2011.01) |
| *H04N 21/6547* | (2011.01) |
| *H04N 21/432* | (2011.01) |

(52) U.S. Cl.
CPC ....... *H04N 21/482* (2013.01); *H04N 21/4828* (2013.01); *H04N 21/6543* (2013.01); *H04N 21/6547* (2013.01)

(56) References Cited

U.S. PATENT DOCUMENTS

2007/0011702 A1* 1/2007 Vaysman ............... H04N 21/84
 725/45
2007/0089125 A1* 4/2007 Claassen ............... H04H 60/33
 725/9

* cited by examiner

SYSTEMS AND METHODS FOR PROVIDING BLACKOUT SUPPORT IN VIDEO MOSAIC ENVIRONMENTS

CROSS-REFERENCE TO RELATED APPLICATIONS

This application is a continuation of U.S. patent application Ser. No. 14/701,922, filed May 1, 2015, currently allowed, which is a continuation of U.S. patent application Ser. No. 11/510,363, filed Aug. 24, 2006, now U.S. Pat. No. 9,032,430, which is hereby incorporated by reference herein in its entirety.

BACKGROUND OF THE INVENTION

This invention relates generally to media systems and, more particularly, to blackout features in media systems supporting video mosaics.

A programming blackout occurs when a distribution facility, or other facility, does not broadcast programming at the time it was scheduled to be broadcast. For example, a broadcaster may be prohibited from broadcasting a sporting event if the broadcaster's signal reaches any area within a certain radius of the sports venue where the event is being played. During the programming blackout, the distribution facility may deliver replacement media (or no media at all) on the blacked out channel during the blackout period.

Three illustrative types of programming blackouts are bandwidth blackouts, affiliate protection blackouts, and venue protection blackouts. Bandwidth blackouts may occur when a program has larger than typical bandwidth requirements. For example, a sports program may require more bandwidth than a non-sports program due to its fast-action nature. When a sports program is broadcast, bandwidth may be borrowed from another channel in order to satisfy the increased bandwidth requirement of the sports program. Borrowing bandwidth from a channel may prevent the broadcast of a regularly scheduled program in that channel. Thus, a blackout of that regularly scheduled program occurs.

Affiliate protection blackouts may occur when the same program is scheduled to be broadcast on two separate channels, such as a local network affiliate and a national channel. In an attempt to protect the interests of the local network affiliate, the television service provider may black out the commonly scheduled program on the national channel in the locality of the local network affiliate.

Venue protection blackouts may occur, for example, when the provider of a live event wants to protect the venue of the live event by preventing the event from being televised. For example, when a sporting event, or other event, is not sold out, the sports team may prohibit the broadcast of the event in an attempt to increase ticket sales and attendance for the event and for future events. Thus, a programming blackout may occur on the channel scheduled to broadcast the event.

There have been several solutions proposed for supporting programming blackouts. For a description of one such system for providing blackout features in interactive television program guides, see U.S. patent application Ser. No. 09/996,346, filed Nov. 28, 2001. Due to the ever-increasing number of channels and services available in today's media guidance systems, user interfaces continue to evolve. For example, remotely-generated video mosaics may present multiple video sources to a user in a single media guidance application page. Such remotely-generated mosaics enable users to access multiple services and/or assets from video-rich menu screens and displays.

Current blackout systems fail to adequately support video mosaic screens because the screens are typically remotely-generated and composited from a number of different video sources. One or more of the video sources may include national feeds that should be blacked out on the user equipment. This may result in video cells in a video mosaic screen presenting video that should in fact be blacked out.

For example, a user may request a remotely-generated sports genre video mosaic page that contains six live sporting events. Each event may be presented in its own video cell or window in a remotely-generated video mosaic page. Two of the six sporting events may correspond to national television feeds that are blacked out on the user equipment due to one or more venue protection blackouts (e.g., the user is located within some geographic distance from the sporting event venue and the event is not sold out) and another sporting event may be blacked out due to an affiliate protection blackout (e.g., the event is also being broadcast on a local network channel). Current blackout systems are not capable of blacking out individual elements within a remotely-generated video mosaic screen; therefore, events are presented in violation of the blackout. This is highly undesirable, as service operators are typically under contract not to broadcast blacked out content, yet the user still desires to have some content presented in place of the blacked out content and to be able to view the remainder of the video mosaic.

SUMMARY OF THE INVENTION

In accordance with the principles of the present invention, a video mosaic client is implemented on a user's equipment. The video mosaic client supports the individual control of objects in a remotely-generated video mosaic display.

In response to receiving a request for a video mosaic page, the video mosaic client may receive and parse blackout information in screen data associated with the video mosaic page. The screen data may be sent in-band along with one or more video streams or out-of-band. Once the screen data is parsed, the video mosaic client may analyze the received blackout information and determine if any objects in the video mosaic page are, or should be, blacked out.

If the video mosaic client determines that an object in a video mosaic page is, or should be, blacked out, the video mosaic client may perform one or more of the following actions in connection with the video mosaic page: mask the location of the blacked out object in the mosaic page, block the object's associated audio, prevent the user from highlighting the blacked out object, redefine the action data associated with the blacked out object (e.g., the object's on-click action data), provide alternate, replacement media content for the blacked out object, or any suitable combination of these actions.

In some embodiments, blacked out objects in a mosaic screen are masked with an overlay that blocks the object from being displayed on the mosaic page. The object's associated audio may also be blocked. In other embodiments, the blacked out cell may be replaced with a graphic, icon, image, text, or a replacement video asset, including targeted advertising or alternatively a data feed that would provide summary information for the blacked out game (e.g., a sports ticker), score, time left in the game, etc. In some embodiments, the replacement asset may be substituted by hardware in a cable headend before the mosaic page is delivered to a requesting client. In other embodiments, the substitution may occur locally at the user equipment. The mosaic page may then be re-rendered or recreated with the replacement asset. Locally-stored media may also be displayed in lieu of blacked out content in a mosaic page.

In response to the user selection of a blacked out object, a user may be presented with an overlay or menu of blackout options. These options may include replacing the blacked out object with replacement content, searching for content similar to the blacked out content that is accessible by the user equipment, or purchasing tickets or obtaining more information about the blacked out content such as the sports ticker referenced above. Another option that could be presented to the user is to record the blacked out event to the users DVR box and allow playback after the blackout conditions have expired.

Blackout information may be provided for each object in a video mosaic page. The blackout information may include, for example, information identifying a blacked out program, such as the program's unique identifier or time and channel information. In some embodiments, the blackout information may also be used to create a set of blackout rules on the user equipment. For example, the blackout information may contain locality information, such as blackout zip codes, cities, states, geographic coordinates, or any other suitable information from which a location may be derived. This information may be compared to locality information present on the user equipment to determine if the content should be blacked out. For example, a local variable could be defined on the user equipment that identifies the current location of the user equipment. As the user equipment changes location, the local variable may be automatically updated by the video mosaic client to reflect the change in location.

In some embodiments, blackout information may include blackout flag structures associated with one or more objects in a video mosaic page. The blackout flag structures may identify one or more blackout source identifiers (e.g., channel identifiers) associated with a video mosaic object. If any of the blackout source identifiers are present in the local channel map on the user equipment, the video mosaic client may blackout the object in the video mosaic page. Blackout flag structures may be defined for each object in the video mosaic page or only for objects that are, or should be, currently blacked out on the user equipment.

In some embodiments, the blackout flag structures may also include one or more blackout multicast addresses (MCAs). The MCAs may be indicative of the location of the user equipment. For example, the multicast addresses may correspond to several local cable headends from which the user equipment receives video streams, screen data, blackout information, interactive application data, or any other suitable information. If any MCA specified in the blackout flag matches an MCA associated with the user equipment, the video mosaic client may blackout the object associated with the blackout flag.

In some embodiments, the blackout flag structures may also include one or more blackout controller identifiers. The controller identifiers may include unique identifiers associated with a multiple system operator (MSO) or the operator's access control system. If any blackout controller identifier matches the controller identifier of the user equipment, the video mosaic client may black out the object associated with the blackout flag.

BRIEF DESCRIPTION OF THE DRAWINGS

The above and other features of the present invention, its nature and various advantages will be more apparent upon consideration of the following detailed description, taken in conjunction with the accompanying drawings, in which.

DETAILED DESCRIPTION OF THE PREFERRED EMBODIMENTS

The systems and methods described herein are directed toward providing enhanced blackout functionality in video mosaic screens. Although the described embodiments may refer to Video-Rich Navigation (VRN) screens, displays, pages, and/or environments, the present invention may be used with any remotely-generated or locally-generated video mosaic screens. In addition, although the windows or cells of the mosaic pages are described herein as being populated with analog or digital video from broadcast television channels, the windows or cells of the mosaic pages may be populated with any suitable video assets or media content. These video assets may include live broadcast programs, video on-demand (VOD) assets, pay-per-view (PPV) assets, recorded assets (e.g., from a digital video recorder, or DVR), locally stored assets, advertising, websites, previews, Webcasts, interactive games and applications, or any other suitable content. The cells may contain full-motion video, audio, still images, text, icons, logos, or any combination of these (or any other suitable) elements.

Figure 1:
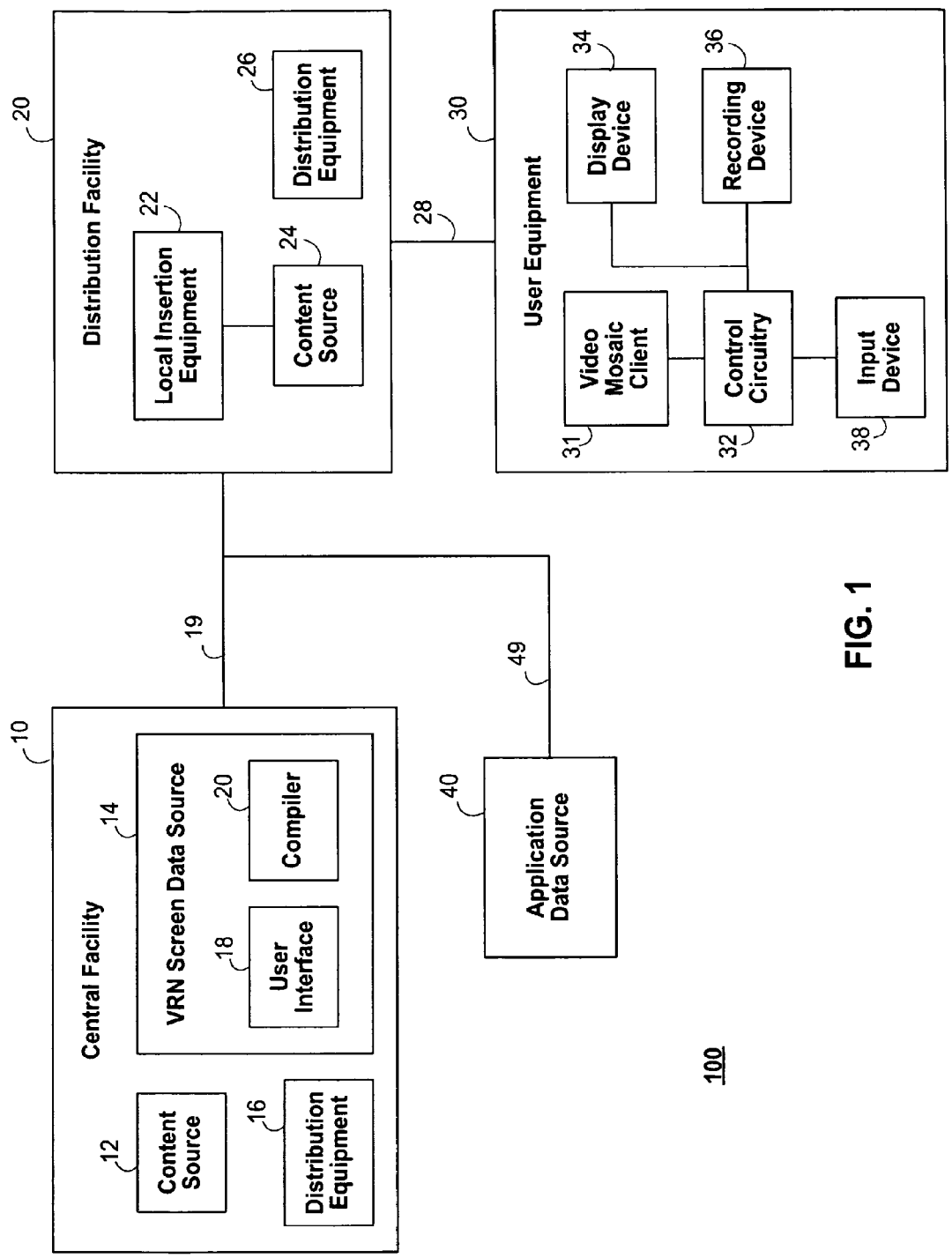
FIG. 1 is a diagram of an illustrative interactive media system in accordance with one embodiment of the invention.

FIG. 1 shows illustrative media system architecture 100 for providing blackout support in a VRN environment in accordance with one embodiment of the invention. Central facility 10 may include content source 12, VRN screen data source 14, and distribution equipment 16. Content source 12 may include any equipment suitable for producing or generating VRN screens. The video content from content source 12 may be in analog or digital form. In other embodiments, content source 12 may be in a facility other than central facility 10, and may also provide content for distribution as regular television channels (e.g., broadcast programming, VOD content, etc.).

VRN screen data source 14 may be any equipment suitable for generating VRN screen data. For example, VRN screen data source 14 may be a personal-computer (PC) based system or a workstation. User interface 18 may be any suitable interface, such as a Windows-based or Unix-based graphic user interface (GUI), which allows, for example, an operator to define VRN definitional files and synchronize the VRN screen data of the definitional files with content from content source 12. The user interface may allow an operator to, for example, specify transitions between distinct configuration specifications for selectable items in synchronization with video content. The user interface may also allow an operator to define control data which controls, inter alia, the appearance, functionality, and interactivity of the screen elements, as well as the content or asset displayed in a screen element.

The screen data may also include blackout information. The blackout information may be inserted into the screen data by central facility 10 (e.g., the blackout information may be generated by VRN screen data source 14) or distribution facility 20. The blackout information may be entered by an operator, may be generated automatically from another system (such as an access-and-control system), or may be generated in any other suitable manner or combination thereof. The blackout information may include, for example, one or more blackout source identifiers, blackout multicast addresses (MCAs), blackout controller identifiers, channel map identifiers, cable plant identifiers, or any other suitable information. The blackout information may also include locality information, such as a set of zip codes where the object associated with the screen data should not be presented. See FIG. 10, below, for an illustrative blackout flag data structure for use by VRN screen data source 14. Compiler 20, which may include any suitable combination of hardware and software, compiles or translates the VRN screen data of the definitional files into another format, such as binary, XML, or HTML format. In some embodiments, input from user interface 18 may be used to directly generate the screen data without need for compiler 20.

Blackout information may also include blackout time definitions. These definitions may specify, for example, that a particular blackout is in effect between 3:00 PM EDT and 6:00 PM EDT. As another example, a blackout may be linked to a specific event in a television program guide database, with its activation time equal to the start time of the event and its deactivation time equal to the end time of the event. In some embodiments, the blackout time definitions may be included with the VRN screen data. In other embodiments, the blackout time definitions may be used to determine when to include blackout information in the VRN screen data.

Distribution equipment 16 may be any suitable equipment for distributing VRN screens from content source 12 and VRN screen data from VRN screen data source 14 over communications path 19 to distribution facility 20, and further over communication path 28 for distribution to user equipment 30. Central facility 10 may distribute the screens and screen data to multiple distribution facilities 20, but only one has been shown to avoid over-complicating the drawing. In other embodiments, central facility 10 may distribute the VRN screens and screen data to users at user equipment 30 directly. Distribution equipment 16 may distribute the VRN screens and VRN screen data in any suitable analog or digital format and over any suitable communications path (e.g., satellite or terrestrial broadcast, the Internet, etc.). VRN screen data and blackout information may be distributed in-band or out-of-band from the VRN screens.

Distribution facility 20 may be any facility (e.g., a cable headend) suitable for receiving the VRN screens and screen data and distributing the screens and screen data to user equipment 30. There may be multiple users at multiple instances of user equipment 30, but only one instance of user equipment has been shown to avoid over-complicating the drawing. Distribution facility 20 may include local insertion equipment 22 and content source 24 for allowing a local operator to insert content and data into the VRN screens or VRN screen data, respectively, and compile VRN screen data into binary format for transmission (if required). Local insertion equipment 22 may run, for example, a local version of user interface 18 and compiler 20.

Distribution equipment 26 may distribute the VRN screens and VRN screen data in any suitable analog or digital format and over any suitable communications path to user equipment 30 (e.g., broadcast, cable, or the Internet.). The communication paths 19, 49, and 28 may include, for example, a satellite path, a fiber-optic path, a cable path, an Internet path, or any other suitable wired or wireless path. For example, VRN screens may be provided as MPEG-2 feeds. Distribution equipment 26 may provide the VRN screens (and the VRN screen data) as tunable analog or digital channels, or as VOD streams (both of which are referred to herein as VRN channels). The VRN channels provide the users of user equipment 30 with a set of interactive features that make up a VRN application.

In some embodiments, distribution facility 20 may provide the VRN channel full-time over a given analog or digital channel. Alternatively, distribution facility 20 may provide VRN channels on-demand or during specific time intervals.

Distribution facility 20 may provide one or more VRN applications to user equipment 30. A VRN application may include a set of VRN screens, buttons, and associated functionality. For example, FIG. 4, described in more detail below, shows a homepage display screen associated with an illustrative VRN application.

User equipment 30 may include any equipment suitable for providing an interactive media experience and for implementing the VRN applications provided by distribution facility 20. User equipment 30 may include television equipment such as a television, set-top box, recording device, video player, user input device (e.g., remote control, keyboard, mouse, touch pad, touch screen, or voice recognition interface), or any other device suitable for providing an interactive multimedia experience. For example, user equipment 30 may include a DCT 2000, 2500, 5100, 6208 or 6412 set-top box provided by Motorola, Inc. In some embodiments, user equipment 30 may include computer equipment, such as a personal computer with a television card (PCTV). In some embodiments, user equipment 30 may include a gaming system, a portable electronic device, such as a portable DVD player, a portable gaming device, a cellular telephone, a PDA, a music player (e.g., MP3 player), or any other suitable portable or fixed device.

In the example of FIG. 1, user equipment 30 includes at least control circuitry 32, display device 34, recording device 36, user input device 38, and video mosaic client 31, which may be implemented as separate devices or as a single device. Video mosaic client 31 may also be implemented on user equipment 30 to receive, execute, and support VRN applications.

Control circuitry 32 is adapted to receive user input from input device 38 and execute the instructions of video mosaic client 31 and any other interactive applications running on user equipment 30. Control circuitry 32 may include one or more tuners (e.g., analog or digital tuners), decoders (e.g., MPEG decoders), processors (e.g., Motorola 68000 family processors), memory (i.e., RAM and hard disks), communications circuitry (e.g., cable modem circuitry), input/output circuitry (e.g., graphics circuitry), connections to the various devices of user equipment 30, and any other suitable component for providing analog or digital media programming and interactive media features. In one embodiment, control circuitry 32 may be included as part of one of the devices of user equipment 30 such as, for example, part of recording device 36, display device 34, or any other suitable device (e.g., a set-top box, television, video player, etc.).

Display device 34 may include any suitable device such as, for example, a television monitor, an LCD screen, a computer monitor, or a display incorporated in user equipment 30 (e.g., a cellular telephone display or music player display). Display device 34 may also be configured to provide for the output of audio and/or other sensory output (e.g., a holographic projector or virtual reality simulator).

Recording device 36 may be a personal video recorder (PVR), digital video recorder (DVR), video cassette recorder (VCR), DVD-recorder, or any other suitable recording device. Recording device 36 may include one or more tuners.

Video mosaic client 31 may be implemented on user equipment 30 as a stand alone applications or part of another interactive application, such as an interactive media guidance application (IMGA) or interactive program guide (IPG). One or more of the interactive applications may receive interactive application data from application data source 40. As shown in FIG. 1, the data may be received via distribution facility 20 over communication path 49. Alternatively, the data may be received by user equipment 30 from application data source 40 over a direct communication path (not shown). Application data source 40 may also be part of central facility 10 or distribution facility 20. In some embodiments, the interactive application data may include elements that are referenced in the VRN screen data for inclusion in the VRN application such as graphics, logos, advertising, and the like. VRN templates, for example, may be provided as part of the interactive television application data.

Homepages (and other VRN screens or pages) delivered to user equipment 30 may include a number of interactive elements. Interactive elements may be highlighted and selected. If the user navigates to a specific interactive element (e.g., by using the arrow keys on a remote control device), the interactive element may be visually highlighted in some fashion (e.g., a colored border may appear around the element). If the user selects a highlighted interactive element (e.g., by pressing the "OK" button on a remote control device), the system may display a specific tunable channel, VOD clip, VOD screen, or another interactive application screen, based on selection behavior specified for the interactive element in the VRN screen data.

Video mosaic client 31 provides enhanced blackout functionality for VRN screens and pages. For example, video mosaic client 31 may parse received VRN screen data to determine if one or more objects in a VRN or video mosaic screen should be blacked out. In some embodiments, the blackout information in the screen data simply specifies the object or objects in the video mosaic page that should be blacked out on the user equipment. In these embodiments, each user equipment may receive different blackout information, depending on such factors as the user equipment's locality, channel map, or any other suitable information. Video mosaic client 31 may determine the location of the blacked out object within the video mosaic page and take appropriate action to blackout the object. In other embodiments, the same blackout information is delivered to all users requesting the same video mosaic page in the form of one or more blackout flag structures. Video mosaic client 31 parses the received blackout flag structures to determine if any objects in the video mosaic page should be blacked out. As described in more detail with regard to FIG. 10, below, the blackout flag structures may include one or more blackout source identifiers. If any of the blackout source identifiers appear in the local source map (e.g., the local channel map) on user equipment 30, video mosaic client 31 may blackout the element associated with the source identifier(s). As described above, blacking out a video mosaic screen element or object may include performing one or more of the following actions: masking the location of the blacked out object in the mosaic page, blocking the object's associated audio, preventing the user from highlighting the blacked out object, redefining the action data associated with the blacked out object (e.g., the object's on-click action data), providing alternate, replacement media content for the blacked out object, or any suitable combination of these actions. These actions are described in more detail below in regard to FIGS. 11-14.

Figure 8:
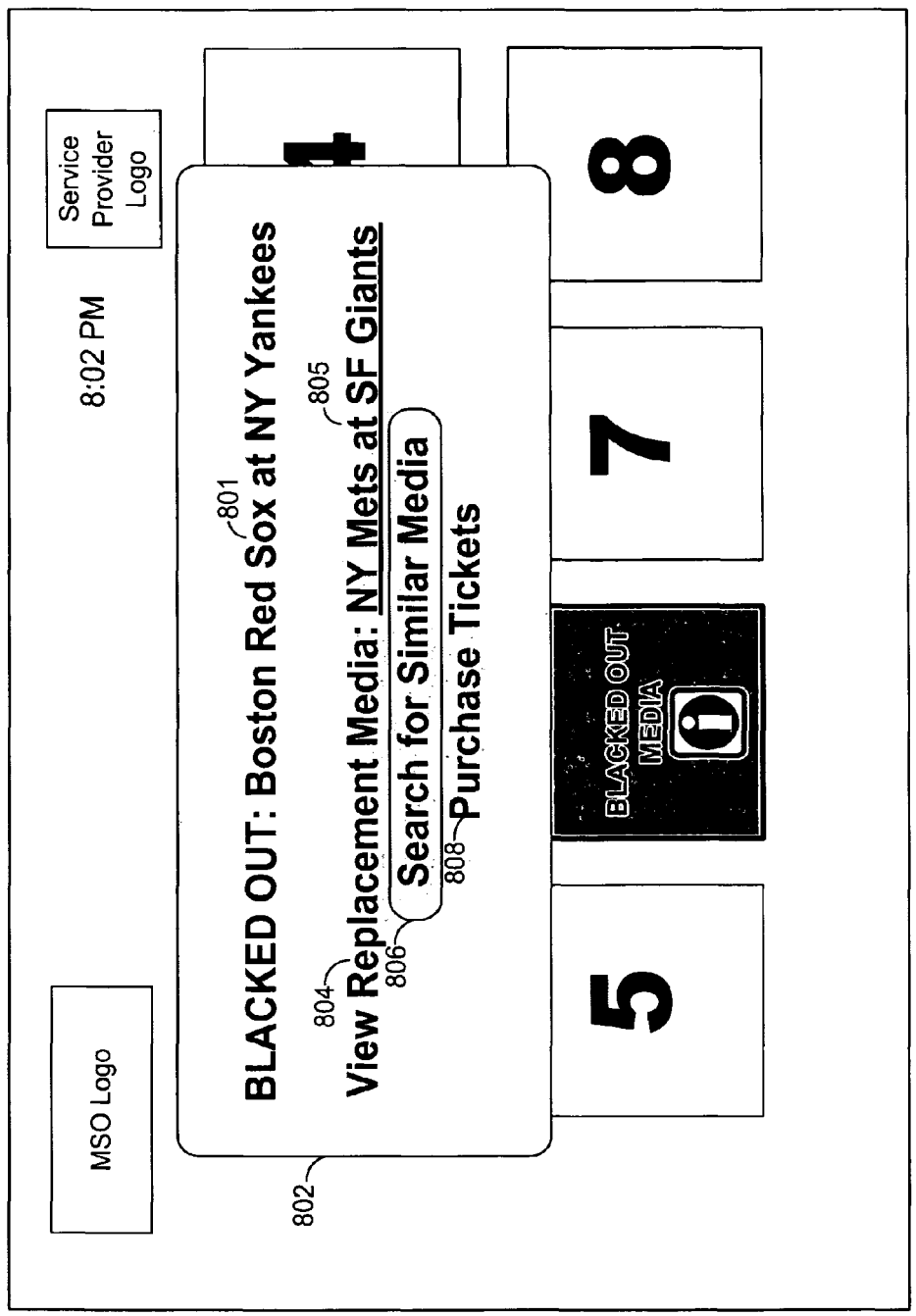
FIG. 8 is an illustrative display screen showing a blacked out overlay with options for a blacked out video cell in accordance with one embodiment of the present invention.

In some embodiments, blacked out cells are not selectable by the user. For example, video mosaic client 31 may prevent user selection of blacked out cells by moving the selection cursor to the next cell that is not blacked out. In other embodiments, users may select blacked out cells. Upon selecting a blacked out cell, video mosaic client 31 may display various blackout options to the user. These options may allow a user to substitute replacement media in a blacked out cell or window, search for accessible media similar to the blacked out media, purchase tickets, obtain more information, or any other suitable action. FIG. 8, described below, shows illustrative blackout options in one embodiment.

Although, in the illustrated embodiment of FIG. 1, video mosaic client 31 is internal to user equipment 30, video mosaic client 31 may be implemented externally or partially implemented externally to user equipment 30. For example, video mosaic client 31 may be implemented at central facility 10 or distribution facility 20 and may run using a client-server or distributed architecture where some of the application is implemented locally on user equipment 30 in the form of a client process and some of the application is implemented at a remote location in the form of a server process. Video mosaic client 31 may also be implemented completely on any suitable server, computer equipment, or set-top box accessible by user equipment 30.

Figure 2:
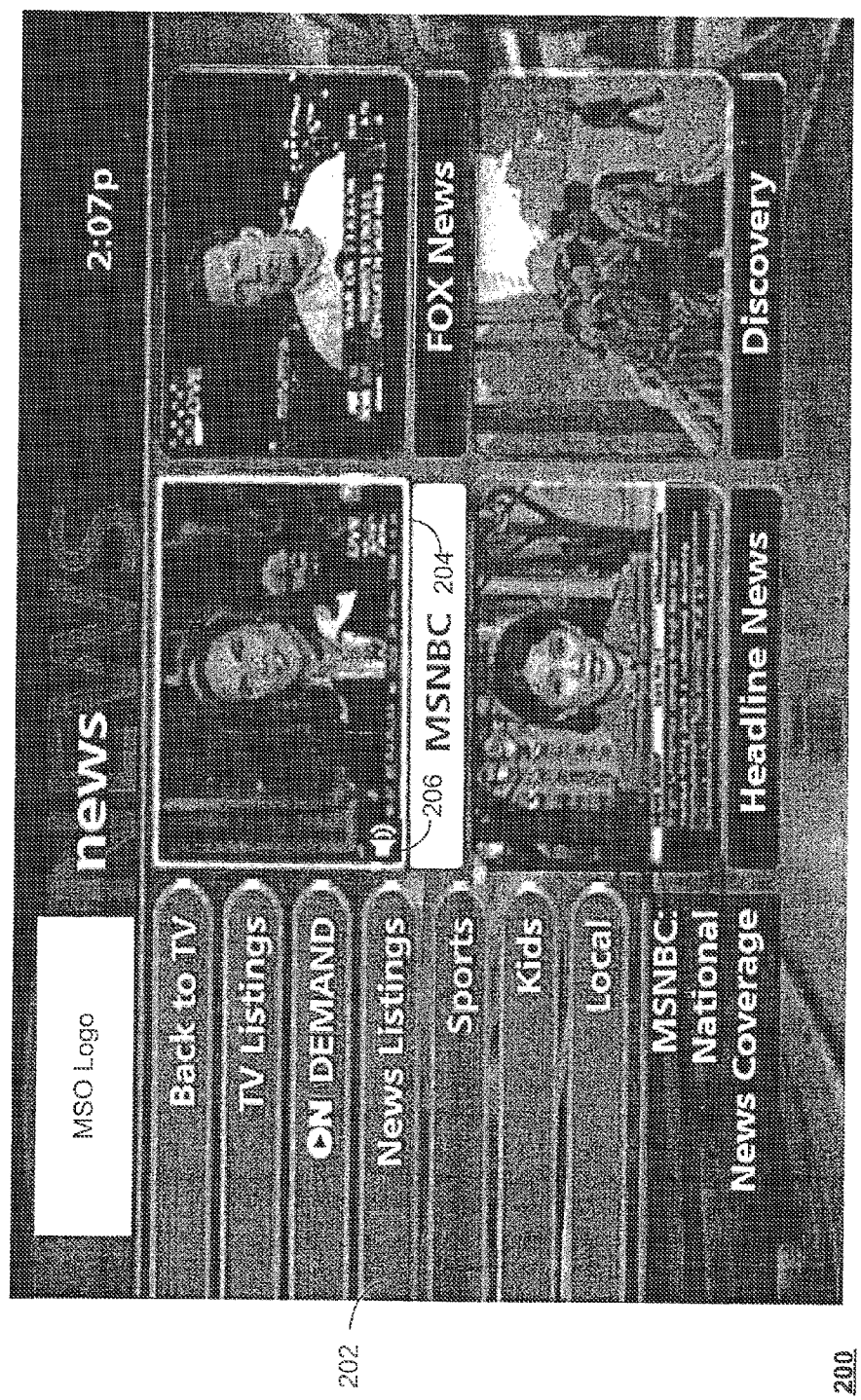
FIG. 2 is an illustrative display screen showing a video mosaic page in accordance with one embodiment of the invention.

FIG. 2 shows illustrative genre video mosaic display 200 in accordance with one embodiment of the invention. Display 200 contains four large video cells displaying four different news channels or programs in full-motion video. The user may be presented with a different genre video mosaic page by selecting the various buttons on the left side of display screen 200. For example, news genre display 200 may be presented upon selecting button 202. Similar video mosaic pages may be displayed for other genres, including sports and kids programming. As shown in the example of FIG. 2, cell 204 is currently selected. The audio associated with cell 204 is currently being played, as indicated by icon 206. The audio for the remaining, unselected cell windows may be muted until the user selects the individual cells.

Figure 3:
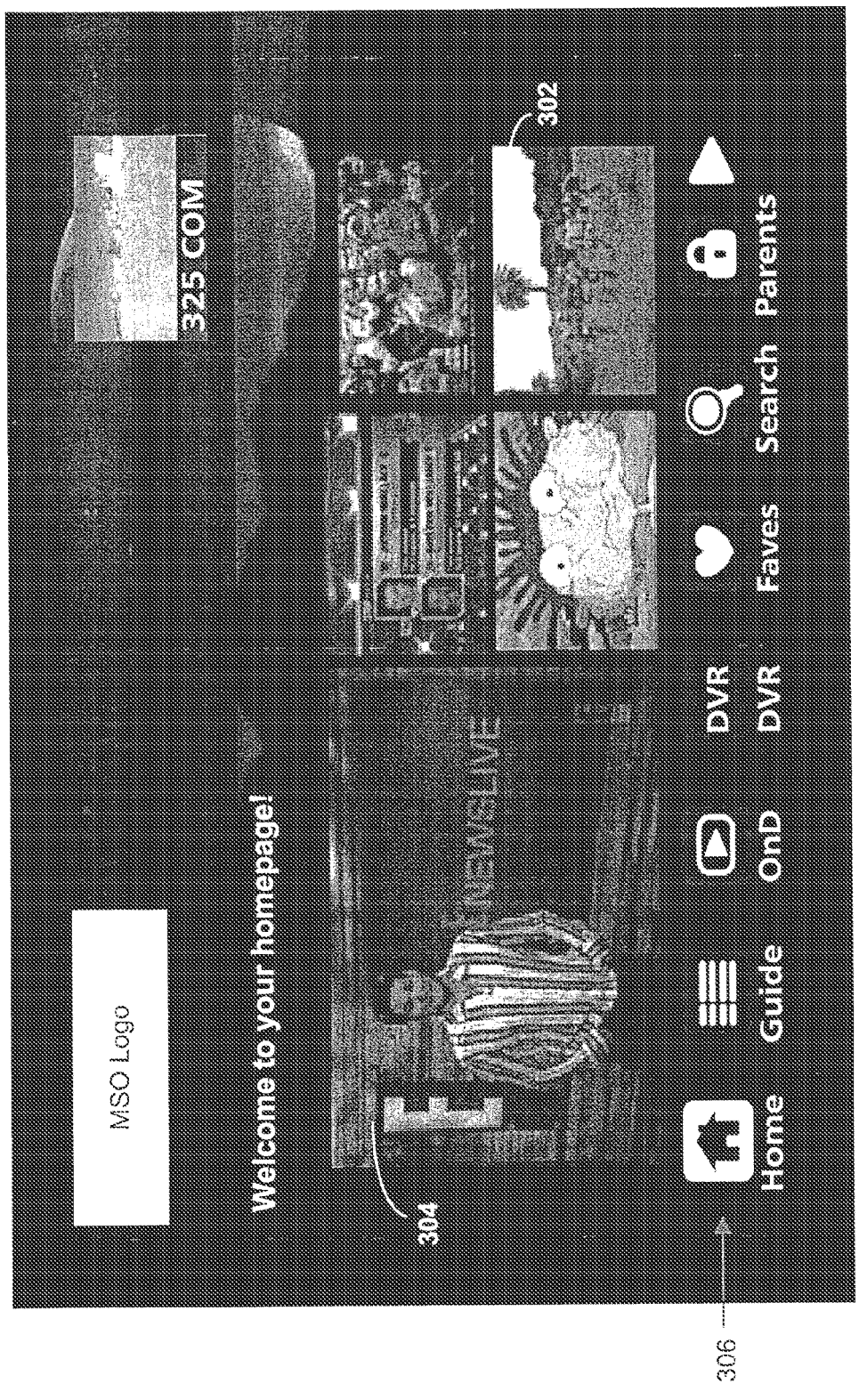
FIG. 3 is an illustrative display screen showing a video mosaic homepage with user navigation buttons in accordance with one embodiment of the invention.

FIG. 3 shows illustrative VRN homepage 300 in accordance with one embodiment of the invention. In some embodiments, homepage 300 is accessible through a particular digital television channel. A user may also be presented with homepage 300 after selecting an appropriate button on input device 38 (FIG. 1). For example, a "Home Page" button may provide direct access to homepage 300. In some embodiments, homepage 300 may be optionally locked, requiring a valid parental control access code input in order to view the page. Homepage 300 may include main cell 304, one or more thumbnail cells 302, and option buttons 306. Main cell 304 and thumbnail cell 302 may both be VRN cells, capable of displaying full-motion video. In some embodiments, main cell 304 is approximately four times larger in size than thumbnail cell 302.

Options buttons 306 may include single-selection access to a variety of commonly-used features. For example, options buttons 306 may link the user to the interactive media guidance application, on-demand or digital video recorder (DVR) resources, or permit the user to search for available media.

Figure 4:
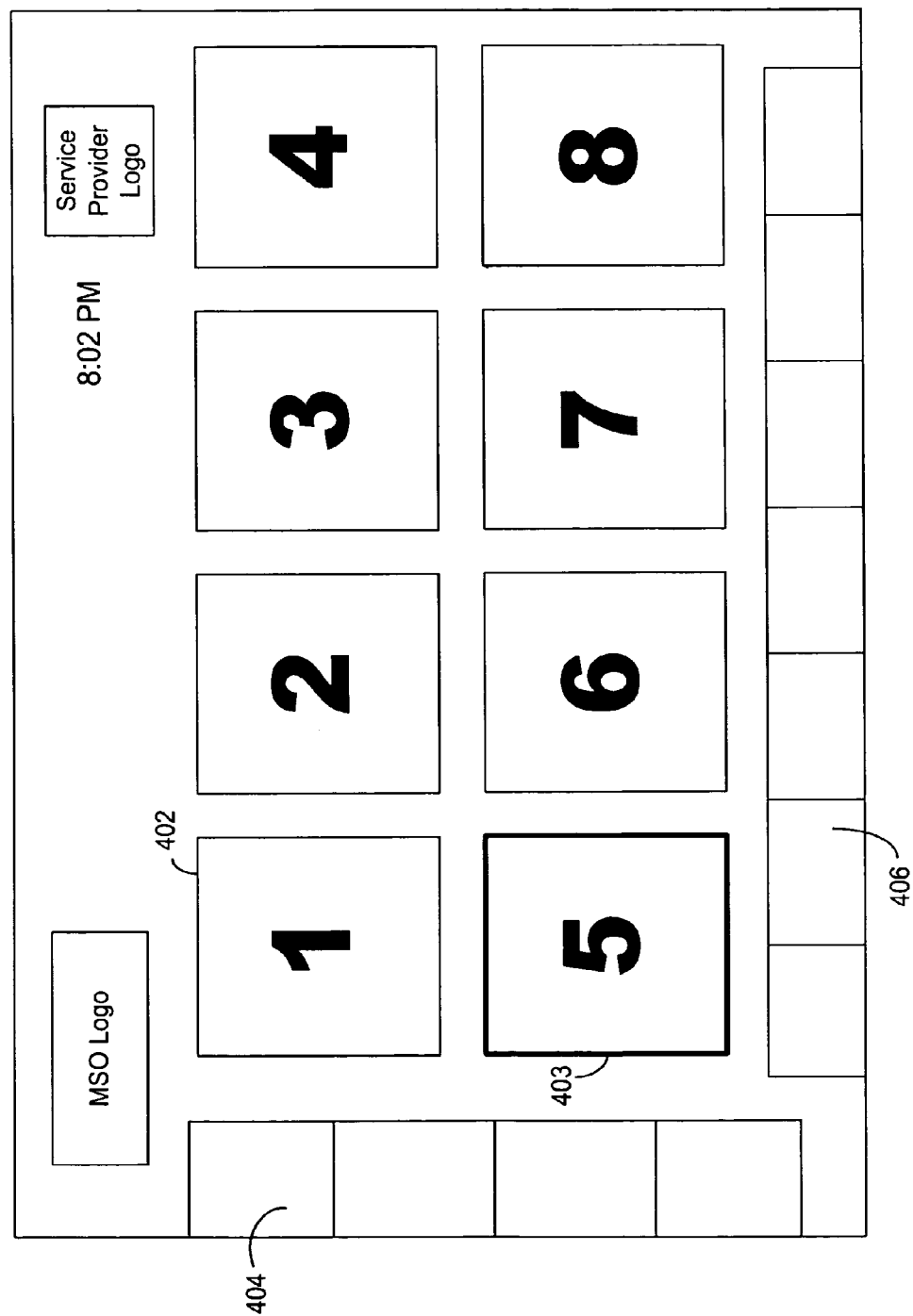
FIG. 4 is an illustrative generic display screen showing a number of video windows, or cells, in accordance with one embodiment of the invention.

FIG. 4 shows illustrative generic video mosaic display screen 400 in accordance with the invention. In the example of FIG. 4, screen 400 contains eight numbered cells, or windows. Each of these eight cells may be populated with a different asset or channel. For example, cell 402 may include full-motion video from channel 225 Cinemax while cell 403 may contain promotional advertising for new VOD movie releases. Each of the cells in display 400 may be individually selected using input device 38 (FIG. 1). For example, the user may highlight a cell in display 400 using the arrow or cursor keys on a remote control. In the example of FIG. 4, cell 403 is currently highlighted, as shown by the darkened border around the cell. One or more cells may be simultaneously selected, if desired. For example, upon pressing an "OK" key on input device 38 (FIG. 1), the selected status of a cell may toggle on and off. The user may then select one or more additional cells in the same manner.

The number, location, size, and shape of the cells in display 400 may be altered without departing from the spirit of the invention. As described above, screen data may be used to define the elements in a video mosaic page. This data may define more or fewer than eight cells and cells of different sizes, positions, and shapes than those shown in FIG. 4. In some embodiments, the properties of the cells in display 400 are customizable by the user. For example, video mosaic client 31 (FIG. 1) may support variable-sized cells, and the user may drag a corner of a cell using input device 38 (FIG. 1) to increase or decrease the size of the cell. Similarly, a user may reshape a cell in one or more dimensions by dragging a cell boundary other than a corner. The video mosaic client may also permit cell positions to be altered in real-time while video assets are playing. For example, a user may drag one or more cells to new locations or rearrange the placement of the cells to further customize the page.

VRN display screen 400 may also include one or more of vertical option buttons 404 and horizontal option buttons 406. These buttons may link screen 400 to other VRN screens, the main IMGA screen, or perform any suitable functionality. For example, one button may select all the numbered cells in screen 400, while another button may deselect all the numbered cells in screen 400.

Figure 5:
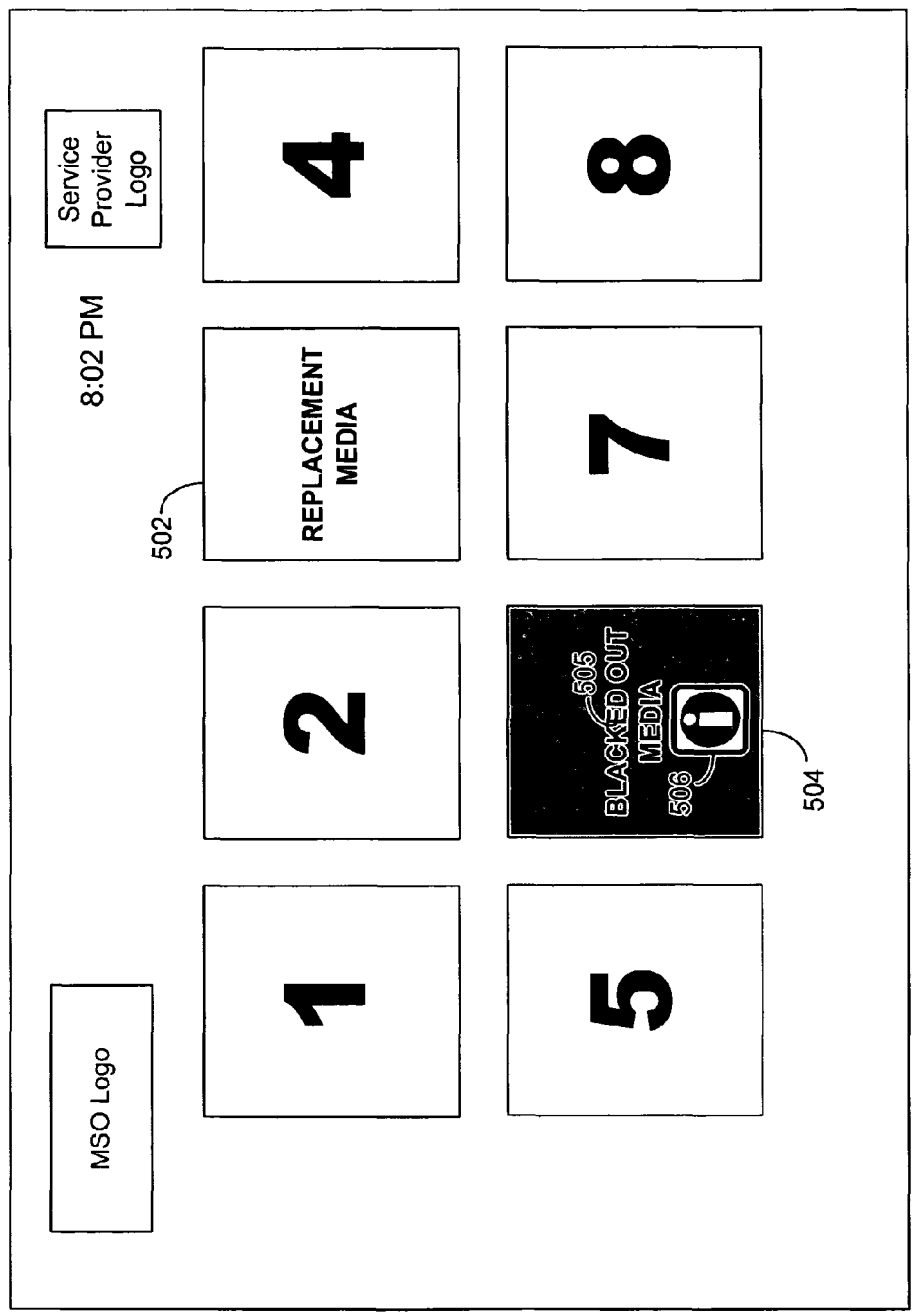
FIG. 5 is an illustrative display screen showing a blacked out masked cell and a blacked out cell showing replacement media in accordance with one embodiment of the invention.

FIG. 5 shows blacked out video windows in video mosaic page 500 in accordance with one embodiment of the invention. Before displaying each element in mosaic page 500, the video mosaic client may parse screen data received by distribution facility 20 (FIG. 1) to determine if any video assets in display 500 should be blacked out. The screen data may include such information as the number of cells in a page, the location (e.g., the x and y coordinates) of each cell, the sizes and shapes of each cell, etc. When a user tunes to a broadcast channel or video service, such as a PPV or VOD service, the video mosaic client may first determine whether the channel or video stream includes screen data. This determination may be made automatically, or performed only when the channel or stream is identified as a remotely-generated mosaic channel or stream. If the channel or video stream does not have associated screen data, the video mosaic client may continue to monitor the channel or stream to detect such data if it subsequently becomes available. Once screen data becomes available, the data is parsed and the individual screen elements are identified.

In some embodiments, the screen data includes unique identifying information for each cell in mosaic page 500. The video mosaic client may then use this unique identifying information to look up blackout information from a network location or content source (e.g., content source 12 or 24, both of FIG. 1). Alternatively, a set of blackout rules may be cached locally to the user equipment in a database or other suitable local storage location. The blackout information looked up from the network location, content source, or database may include any suitable asset information needed to determine if the asset is currently blacked out by one or more programming blackouts.

In one embodiment, the blackout information defines blackout flag structures including one or more source identifiers, one or more multicast addresses (MCAs), and/or one or more controller identifiers, as described in more detail in FIG. 10, below. From this information, video mosaic client 31 (FIG. 1) may determine whether an element in a video mosaic screen should be blacked out. In some embodiments, video assets without blackout information (e.g., without corresponding screen data defining the asset's blackout information) are blacked out by default. In order to prevent users from accessing video data without parsing or processing the associated screen data, various control mechanisms may be used. For example, the video mosaic pages may be converted to one or more hidden channels that are not accessible via normal user equipment operation. Only a VRN application (or another application that supports screen data processing) may be permitted to access the hidden channels. Alternatively or additionally, the screen data may be interleaved with the video stream so that the screen data must be decoded with the video data.

When the video mosaic client determines that one or more elements in a video mosaic page should be blacked out, in some embodiments, the mosaic client may mask, or gray out, those elements with a graphic, icon, text, or logo. For example, blacked out cell 504 is masked with a gray box and a "Blacked Out" label. The location of the mask may be determined from the received screen data. For example, the screen data may define the x and y coordinates of each cell, the cell size, shape, and/or any other property of the cells in display 500.

The screen data may also define control data for each cell. In some embodiments, to determine whether a cell should be blacked out, the video mosaic client may compare the received blackout information to local variables on the user equipment. For example, the control data itself may include a set of conditionals that, when interpreted by the user equipment, cause the video mosaic client to retrieve one or more user equipment variables (e.g., the user's zip code or channel line-up) and determine whether a blackout applies to the particular user equipment.

Figure 9:
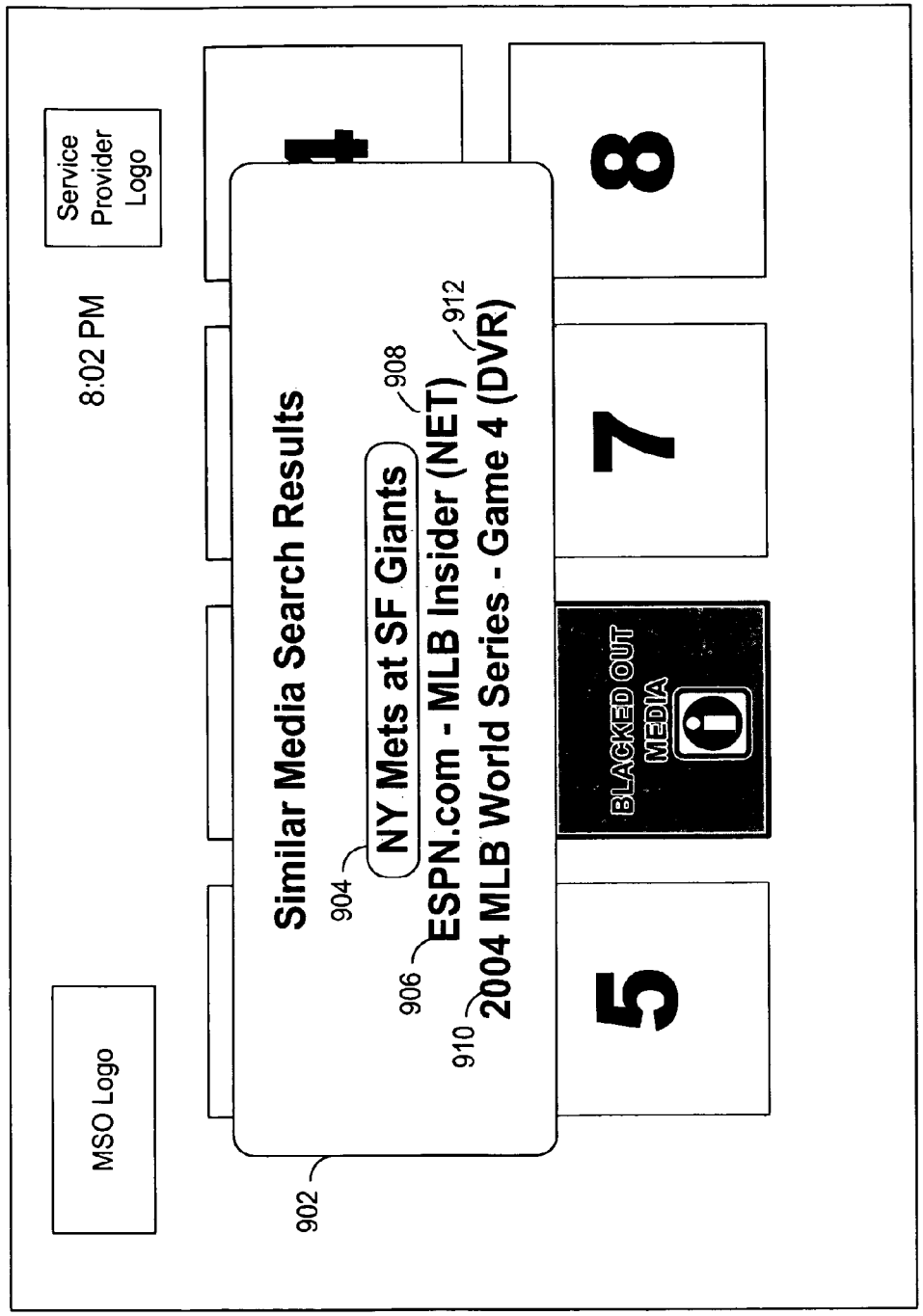
FIG. 9 is an illustrative display screen showing a search results overlay menu in accordance with one embodiment of the present invention.

The control data (also referred to herein as action data) may also define actions associated with a user selection of a cell. For example, the control data may instruct the video mosaic client to link the user to a broadcast channel or to order a VOD or PPV asset upon the user selection of a cell. For blacked out cells, the cells associated control data may be redefined or supplemented by the video mosaic client so that one or more new actions are defined upon a user selection of a blacked out cell. For example, as shown in display screen 800 (FIG. 8), the control data may instruct the video mosaic client to present a blackout option overlay upon the user selection of a blacked out cell. The video mosaic client may also redefine or supplement the control data so that a series of search overlays and prompts are presented to the user upon selection of an blacked out cell, as shown in FIG. 9. The video mosaic client may also redefine or supplement the control data so that any other suitable action occurs upon the user selection of a blacked out cell.

For example, the video mosaic client may override a mosaic template definition by applying a new template to the video mosaic page. The new template definition may globally redefine the action data associated with each object in the video mosaic page that is determined to be blacked out on the user equipment. For example, the new template may overwrite the existing control data relating to each blacked out object in the video mosaic page and define a new series of prompts to be displayed upon user selection of a blacked out object.

In addition to masking the area of a blacked out cell in display screen 500, the video mosaic client may also block the audio associated with any blacked out cell. Blacked out elements in a video mosaic page may also be automatically replaced with substitute media. In some embodiments, the media substitution may be performed locally by the video mosaic client. In other embodiments, the substitution is performed at a local cable headend or other distribution facility, such as distribution facility 20 (FIG. 1). If the substitution is performed before reaching the user equipment at a headend or distribution facility, the facility may utilize hardware, such as video encoding/decoding circuitry, to remove the blacked out video stream and substitute the stream with a replacement video stream. The video mosaic page may then be re-rendered or recreated, if required, and delivered to the user equipment. New screen data may also be added to the mosaic page by the distribution facility to reflect the new replacement content.

If the substitution is performed locally by the video mosaic client, locally-stored video, advertising, and graphics may be used as the replacement media and presented in the mosaic page. Additionally or alternatively, the video mosaic client may substitute any content currently accessible by the user equipment with the blacked out content. For example, broadcast programs, on-demand programs, PPV programs, or media recorded to a local storage device (e.g., recording device 36 of FIG. 1) may be presented in a blacked out cell in lieu of blacked out content. For example, cell 502 may be a blacked out cell that contains full-motion replacement media.

Figure 6:
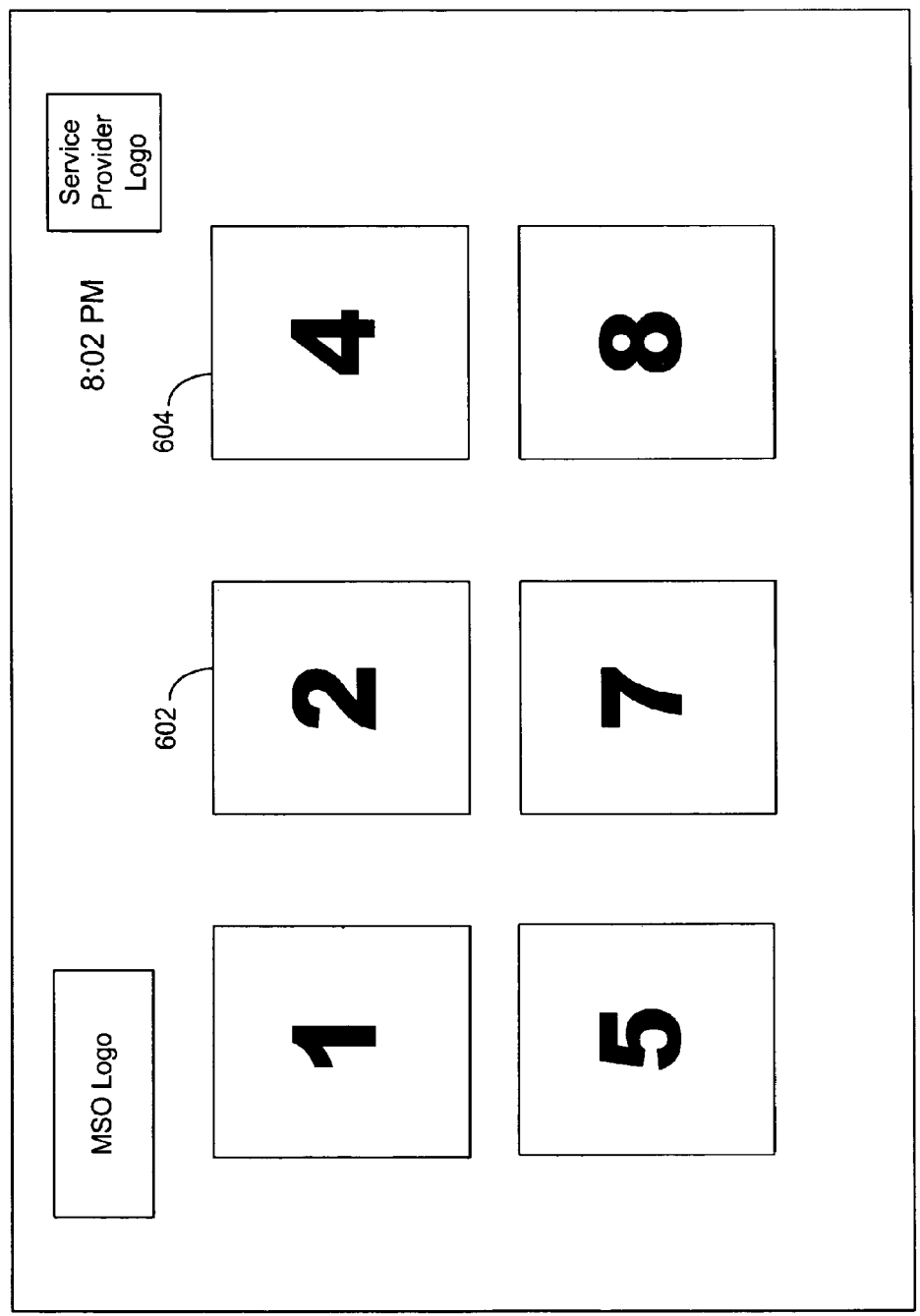
FIG. 6 is an illustrative display screen with the blacked out cells of FIG. 5 removed from the mosaic page in accordance with one embodiment of the present invention.

In some embodiments, blacked out elements in a video mosaic page are removed from the page before presentation of the page to the user. The video mosaic client may then dynamically recreate or re-render the mosaic page without the blacked out elements, if desired. As shown in FIG. 6, this may create the appearance that the blacked out elements never existed. For example, blacked out cell 3 is removed from mosaic screen 600 and cells 602 and 604 are now positioned adjacent to one another. Blacked out cell 6 is similarly removed from the page. In addition to removing the blacked out elements, the video mosaic client may recreate the page so that the remaining cells are relocated or repositioned. For example, the remaining cells may appear centered in mosaic screen 600. In some embodiments, the cell size is also dynamically adjusted to compensate for the missing cells. For example if four out of eight cells are blacked out, the four locked cells may be removed from the display and the size of the remaining four cells may be increased by approximately 50%. In this way, a user may not be aware of blacked out elements that were dynamically removed in a mosaic page.

If blacked out cells are completely removed from the page, and the page is re-rendered with a change in position of the remaining cells, the video mosaic client may map incoming screen data and control data to the location of the new cells. Because the incoming screen data may incorrectly reflect the old location of the cells, the video mosaic client may maintain a table of the original cell locations and the new cell locations. In this way, the mosaic client may associate incoming screen data with the correct cell in the newly rendered page. If the blacked out cells are removed without a change in location of the remaining cells, the video mosaic client may simply ignore or drop any screen data received for the removed cells.

Figure 7:
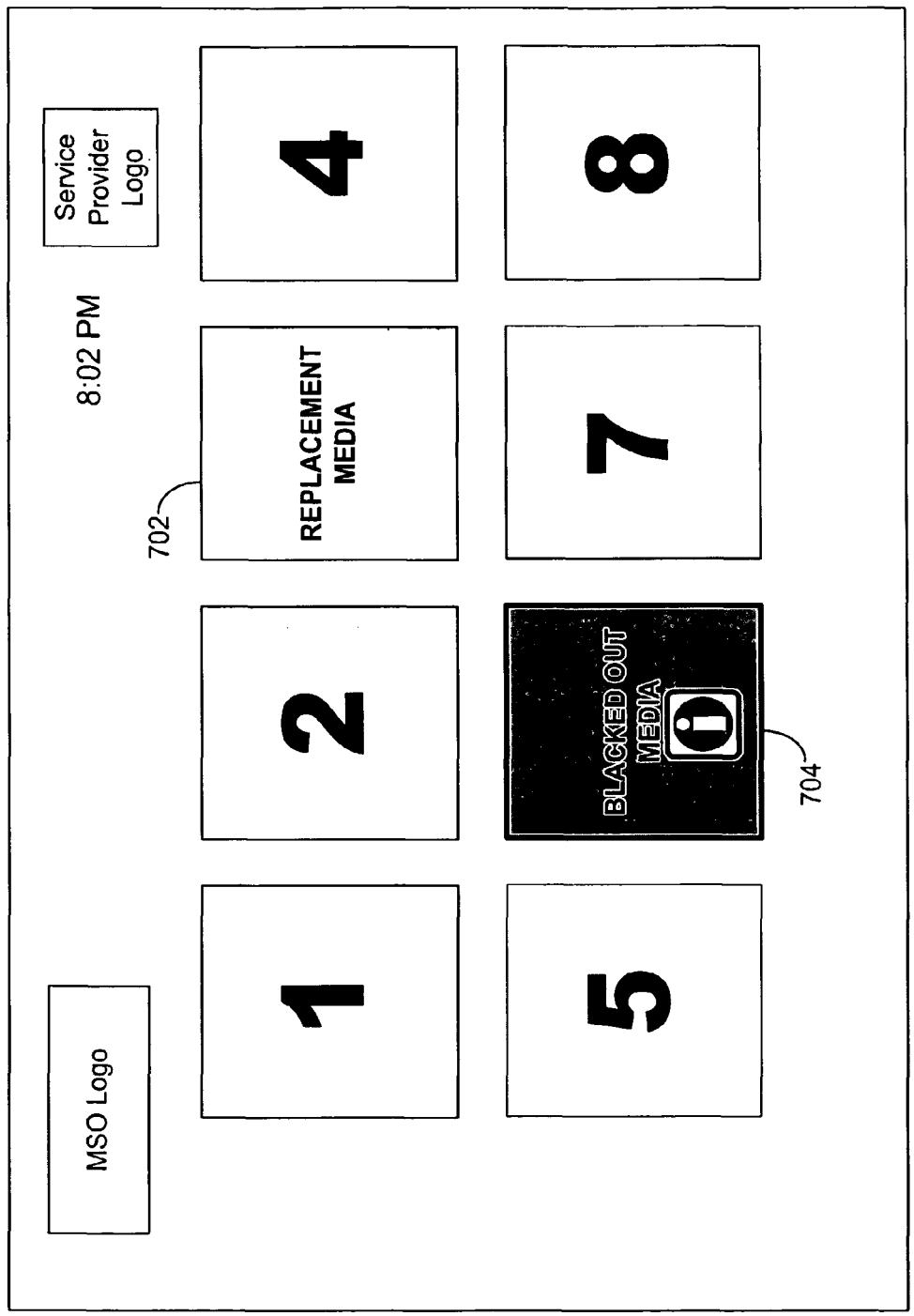
FIG. 7 is an illustrative display screen showing the user selection of a blacked out cell in accordance with one embodiment of the present invention.

FIG. 7 shows illustrative mosaic page 700 with blacked out cells 702 and 704. Blacked out cell 704 may be masked with a gray or black overlay while blacked out cell 702 may contain replacement media content. As described above, in some embodiments, the mosaic client may not permit selection of a blacked out cell. In other embodiments, a user may highlight or select a blacked out cell in the same manner as any other mosaic cell. For example, as shown in FIG. 7, a user may move a cursor using input device 38 (FIG. 1) and select cell 704. Upon selecting cell 704, one or more overlays of blackout options may be presented to the user, as described in more detail below.

FIG. 8 shows illustrative mosaic display 800 in accordance with one embodiment of the invention. Upon selecting a blacked out cell, such as cell 704 (FIG. 7) options overlay 802 may be presented to the user. The overlay may identify the blacked out content in title area 801. Title area 801 may include the title, channel, and/or broadcast time of the blacked out content. Below title area 801 several options may be presented to the user. These options may include view replacement media option 804, search for similar media option 806, and obtain additional information option 808.

Upon selecting option 804, the user may be presented with replacement media listed in replacement media selection 805. In some embodiments, the user may select replacement media selection 805 to be presented with one or more other options for replacement media. In the case of an affiliate protection blackout, the replacement media may be the same event as broadcast by the locally-authorized network. After the user selects option 804, the replacement media identified by replacement media selection 805 may be substituted in the selected blacked out cell. In other embodiments, upon selecting option 804, the user exits the mosaic application and is tuned directly to the selected replacement content.

If the user wishes to locate other media content similar to the content in the blacked out cell, the user may select option 806. Upon selecting option 806 the video mosaic client may access interactive application data, such as interactive media guidance application content listings, and search the data for media similar to the media listed in title area 801. Similar content may be found, for example, by initiating a title search of keywords included in the title listed in title area 801. The video mosaic application may also use other media information, such as actor, director, and genre information (also derived from media guidance application data), in order to construct a search string. In some embodiments, this search string may be presented to the user. The user may then refine the search string by adding or removing search criteria, as desired. To determine the similarity between media, a distance may be calculated between other media content and the blacked out content. The distance may represent the similarity between the media. For a description of systems and methods that determine the similarity between media content using distances, see U.S. patent application Ser. No. 11/324,147, filed Dec. 29, 2005, which is hereby incorporated by reference herein in its entirety. The results of the similar media search may be presented to the user in one or more display screens or overlays, such as overlay 902 (FIG. 9).

In some embodiments, to locate other content for a media search, video mosaic client 31 (FIG. 1) may interface with the media guidance application database resident on the user equipment 30 (FIG. 1). This database may contain, for example, content listing information, including channel/source information, start and stop times, and detailed program information. The database may hold data relating to programs and content currently accessible by the user equipment as well as programs and content that will be accessible in the near future (e.g., within the next 5 days). The video mosaic client may interface with this database through a series of API function calls. The function calls may support database searches, database additions, and database deletions. The API function calls may also return program and content information to the video mosaic client for display in an overlay or object in a video mosaic page. In some embodiments, the list of similar media content may be transmitted as part of the VRN screen data.

The user may also request more information about the blacked out media content by selecting option 808 in overlay 802. This option may link the user to one or more display screens or overlays containing a detailed description of the blacked out content, the length and reason for the blackout, and any other suitable information. In the example of FIG. 8, option 808 provides the user an opportunity to purchase tickets to a blacked out sporting event listed in title area 801 or other future events related to the blacked out event. In the example of FIG. 8, the blacked out event may be a live baseball game, such as the Boston Red Sox at the New York Yankees. Upon selecting option 808 to purchase tickets, tickets to future Boston Red Sox or New York Yankees games may be purchased. For example, the user may be linked directly to a ticket distribution website for purchasing tickets. Additionally or alternatively, the user may be directed to an online auction website for placing a bid on tickets. The control data may include the URL of the website or websites. The URL contained in the control data may additionally include filter criteria to narrow the user's search for tickets and facilitate navigation. For example, the URL may include "www.tickets.com/sports/baseball/," which may bring the user to a ticket distribution website, defaulting at the baseball ticket page. Tickets for other events and performances may also be purchased via option 808.

As described above, upon selecting search option 806, the video mosaic client may link to interactive application data, such as media listings information, to search for media similar to the blacked out media, or the video mosaic client may access a predefined set of similar media content in the VRN screen data. As shown in FIG. 9, the search results may be presented in overlay 902 of display 900. The media content listed in search results overlay 902 may include any type of media content accessible by the user equipment, including, for example, recorded content, PPV programs, VOD program, digital music, Internet websites, and interactive applications (such as interactive games).

In some embodiments, the content listed in overlay 902 is currently accessible by the user equipment (e.g., currently being broadcast). In other embodiments, media content that will soon be accessible may also be listed in overlay 902. For example, broadcast content that will be broadcast within the next 15 minutes may be included in the overlay. In addition, the search results listed in overlay 902 may exclude any blacked out content or content otherwise locked and/or inaccessible by the user equipment or the current user logged on to the user equipment. For example user-based parental controls may be defined on the user equipment. Content exceeding one or more parental control locks for the user may be excluded from the search results even though the content may match the search string or search criteria. In this way, the user can be assured that any media content listed in search results overlay 902 is actually accessible and viewable by the current user.

The content listed in overlay 902 may include broadcast content, such as shown in listing 904. Internet websites may also be searched and listed in overlay 902, as shown in listing 906. Websites, like other content, may be searched by genre, title, or any other suitable characteristics. In the example of FIG. 9, the user searched for similar media relating to a blacked out baseball game, so ESPN.com's MLB Insider webpage may match a sports (or baseball) genre category. Overlay 902 may also include content available on a local recording device, such as recording device 36 (FIG. 1). For example, listing 910 lists a prerecorded baseball game.

Some or all of the listings in overlay 902 may be associated with source identifiers, such as identifiers 908 and 912. These source identifiers may indicate the channel or source of the content listed in overlay 902. Some example source identifiers may include "VOD" for video on-demand assets, "PPV" for pay-per-view assets, "NET" for assets available on the Internet (or a private network), "DVR" for recorded assets, "APP" for interactive applications, "GAME" for interactive games, and "MUSIC" for digital music accessible from the user's music library.

In response to selecting a listing in overlay 902, the user may be tuned directly to the selected content. If the content is not currently accessible, the user may be tuned to the appropriate channel where the content will shortly become available. Additionally or alternatively, the selected blacked out cell in the video mosaic page may be replaced with the selected content. The cell may then present the selected content in full-motion video. Upon substituting replacement media in the blacked out cell, the video mosaic client may also redefine action data associated with the cell so that the cell now behaves like any other non-blacked out cell. In some embodiments, the user's selection of replacement media may be remembered (e.g., saved to memory) for the duration of the blacked out event, even if the user tunes away from and then back to the video mosaic page.

The video mosaic client may parse screen data in order to identify the elements in a video mosaic page. Each "chunk" of screen data may be associated with a specific video asset in a video mosaic page or with any other set or subset of the screen data. For a further description of the screen data chunks and an illustrative object definition, see U.S. patent application Ser. No. 11/395,380, filed Mar. 30, 2006, which is hereby incorporated by reference herein in its entirety. FIG. 10 shows illustrative blackout flag structure 1000 in accordance with one embodiment of the invention. The screen data object definition may include 16-bit flag value 1002, which determines if a blackout flag structure ("BO") is included in the object. Flag value 1002 may also indicate which blackout structures are included. If flag value 1002 indicates that BO is set, one or more blackout flag structures may be included in the object definition.

In general, the video mosaic client needs only some identification of the source of the objects being presented in a video mosaic page and a set of blackout rules to effectively blackout mosaic objects. However, because blackouts are often time-based, maintaining a complete set of blackout rules on the user equipment may require frequent updates and a large amount of bandwidth. Therefore, in some embodiments, a blackout flag structure is used that approximates the blackout rules. For example, blackout rules for National Football League games may require that any broadcaster that has a signal that reaches within a 75-mile radius of an NFL stadium blackout all games at the stadium that are not sold out 72 hours or more before the start of the game. Other, more complex blackout rules may also apply. By using the blackout flag structure described below, the video mosaic client can estimate these complex rules and enforce the programming blackout.

Figure 10:
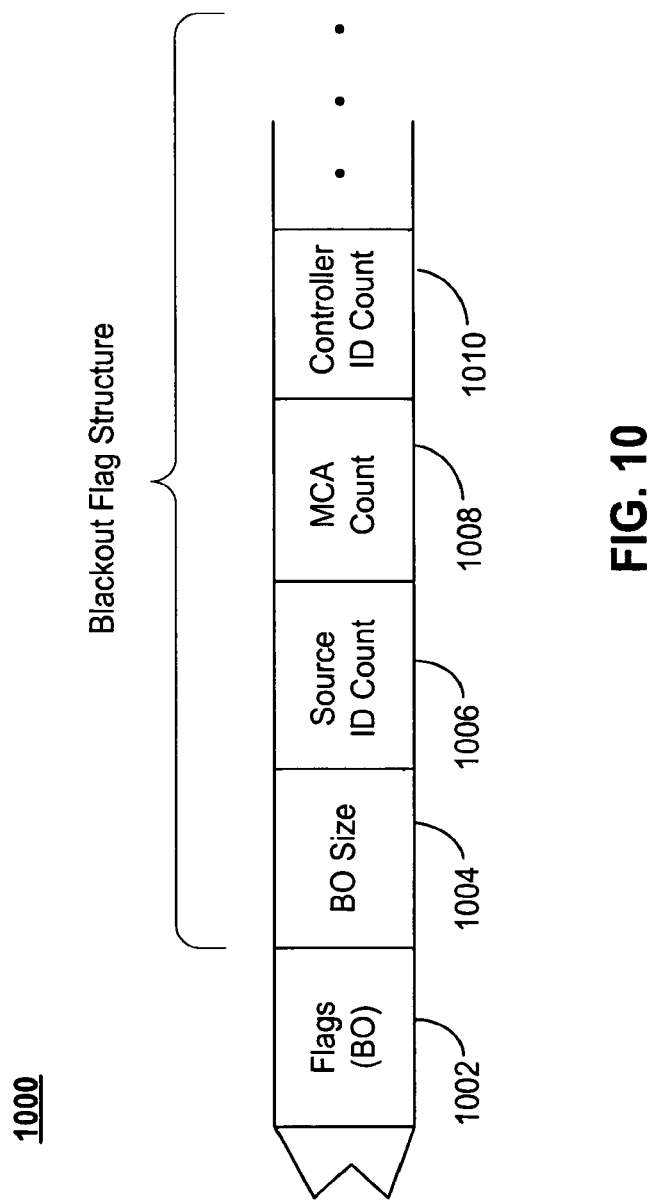
FIG. 10 shows an illustrative blackout flag structure in accordance with one embodiment of the present invention.

In the example of FIG. 10, the blackout flag structure includes at least 16-bit blackout size value 1004, 16-bit blackout source identifier count 1006, 16-bit blackout multicast address (MCA) count 1008, and 16-bit blackout controller identifier count 1010. The three count values may represent the number of blackout source identifiers, blackout multicast addresses, and blackout controller identifiers defined in the blackout flag structure. Immediately following controller identifier count 1010, the blackout flag structure may include the number of blackout source identifiers specified in blackout source identifier count 1006, the number of blackout multicast addresses specified in blackout MCA count 1008, and the number of blackout controller identifiers specified in blackout controller identifier count 1010. Each blackout source identifier, blackout MCA, and blackout controller identifier may be a 16-bit value. Blackout size value 1004 may specify the total size or length of the blackout flag structure.

By providing a list of blackout source identifiers, blackout multicast addresses, and blackout controller identifiers in the screen data, the video mosaic client may determine if any cells or other elements in a video mosaic screen are blacked out using three separate criteria. Other data may also be included in the blackout flag structure to increase the number of blackout criteria, if desired. For example, locality information (e.g., zip codes and/or geographic coordinates) may be specifically provided in the blackout flag structure. If the user equipment has a local zip code or geographic coordinates variable set, this information may be used to determine if the object in the mosaic page should be blacked out. For example, a global positioning system (GPS) or similar system may automatically update latitude and longitude coordinate variables stored in the user equipment. In these embodiments, a GPS receiver (not shown) may be integrated with user equipment 30 (FIG. 1). If the user equipment location is within the coordinates specified by the blackout screen data, the video mosaic client may blackout the object associated with the screen data.

Because the control data stream may be time-synchronized (e.g., a real-time data stream), the video mosaic client may the parse blackout flag structures as new flags are received. Alternatively, the video mosaic client may parse the blackout flag structures at regular intervals (e.g., every 1 minute). If the blackout information in the control data indicates that the object associated with the blackout flag should be blacked out, the video mosaic client may take any of the actions described above to black out the object. If at some point the blackout data in the control data stream changes to indicate the object is no longer blacked out, the video mosaic client can reverse the steps taken to restore the original object. In some embodiments, the blackout flag structures may include the time parameters (e.g., the activation time and the deactivation time) of the blackout. In some embodiments, the time parameters may be omitted under the assumption that the blackout flag structures will be changed at the start and end of the blackout.

The blackout source identifiers included in the blackout flag may indicate one or more blackout channels or sources. For example, the source identifiers corresponding to the channels ESPN and the YES network may be listed as source identifiers in the blackout flag. If at least one of the source identifiers matches any source identifier in the local channel map on the user equipment, the video mosaic client may blackout this object. For example, affiliate protection blackouts may require that one or more local broadcasters have the sole right to broadcast a sporting event. In this example, the source identifiers for the local broadcasters may be specified as blackout source identifiers in the blackout flag structure. Then, if the sporting event is also being presented in a video mosaic page (such as a sports genre mosaic page) as part of a national feed, the video mosaic client may blackout this object.

The blackout multicast addresses included in the blackout flag may indicate one or more network multicast addresses (e.g., IP multicast addresses). If the user equipment is joined to any multicast addresses in the blackout multicast list (or configured to send or receive data at a multicast address in the blackout multicast list), the object associated with the blackout flag structure may be blacked out. For example, one or more multicast address may be associated with a cable headend or network access point. The user equipment may be configured to receive video streams, VRN pages, or screen data at the specified multicast address. In some embodiments, the multicast addresses on the user equipment may be indicative of the user equipment's location. For example, upon powering up user equipment 30 (FIG. 1), the user equipment may automatically listen for incoming video and data at one or more multicast address associated with a local cable headend or distribution facility, such as distribution facility 20 (FIG. 1). If any of the blackout multicast addresses listed in the blackout flag structure matches a multicast address on the user equipment, the video mosaic client may blackout the object associated with the blackout flag structure.

The blackout controller identifiers included in the blackout flag may indicate one or more unique blackout controller identifiers. For example, user equipment 30 (FIG. 1) may be controlled by a particular controller or group of controllers. Each controller may be assigned a unique identifier. Each controller may control one or more groups of user equipment, each group defined by a specific channel map, a specific cable plant, or other criteria. If at least one blackout controller identifier is specified in the blackout flag structure, the blackout may apply to all user equipment being controlled by the specified blackout controller identifier. The blackout flag structure may optionally include a number of channel maps, cable plants, or other subset criteria associated with the blackout controller identifier. If no channel maps, cable plants, or other subset criteria are specified, then the blackout may apply to all user equipment with the specified blackout controller identifier. If at least one channel map, cable plant, or other subset criteria is specified, the blackout may apply only to the specified subset within the controller.

Any other suitable information may be included in the blackout flag structures in other embodiments. For example, the blackout flag structures may include any of the following information: whether the object can be highlighted if its associated content is blacked out; whether to block the object's associated audio; whether the object can be selected if blacked out; whether to automatically provide replacement media; what to display if the object is blacked out (e.g., solid overlay, icon, text, graphic, video); reference to replacement media; one or more lists of similar media content; search criteria for similar media content; whether to automatically display a list of replacement options to user; substitute actions to perform if the object is selected while blacked out; or any other suitable information for determining if the object is to be blacked out and its behavior when displayed, highlighted, or selected if the object is blacked out.

Figure 11:
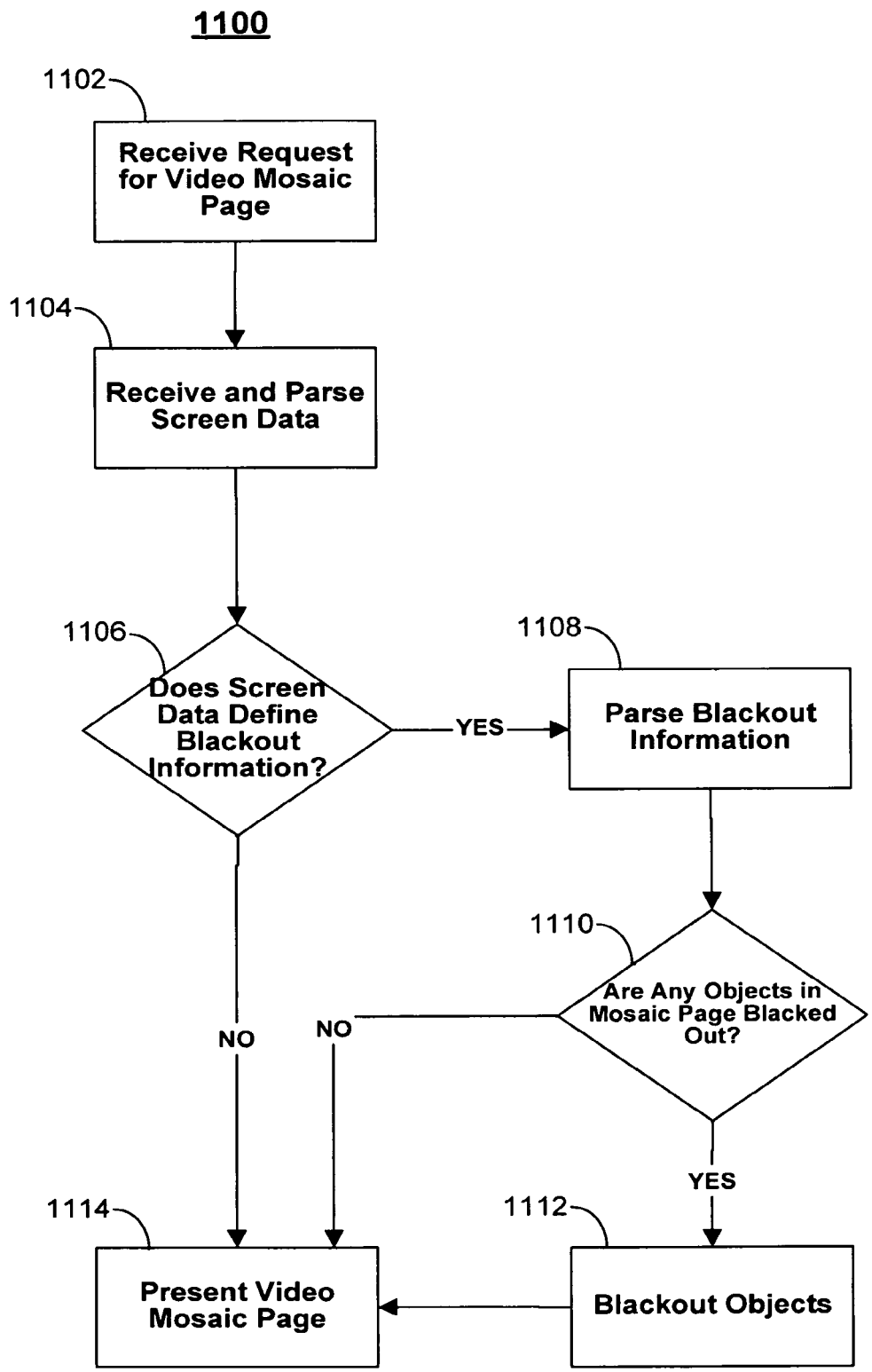
FIG. 11 shows an illustrative process for presenting a video mosaic screen to a user in accordance with one embodiment of the present invention.

FIG. 11 shows illustrative process 1100 for presenting a video mosaic page. At step 1102, a request is received for a video mosaic page. For example, the user may press a "Home Page" button on input device 38 (FIG. 1) to be presented with mosaic homepage 400 (FIG. 4). At step 1104, screen data may be received and parsed. The screen data may be received in-band with the related video assets or out-of-band. At step 1106 video mosaic client 31 (FIG. 1) determines if the screen data defines blackout information. For example, a blackout flag may be set in the object "chunks," as described above. If blackout information is not defined, the video mosaic page may be presented to the user at step 1114. For example display 300 (FIG. 3) may be presented without any mosaic cells blacked out. Alternatively, if the screen data does not define blackout information, the screen data may simply define the channel or source of the mosaic elements. Video mosaic client 31 (FIG. 1) may then access a set of blackout rules maintained locally on user equipment 30 (FIG. 1).

If blackout information is defined at step 1106, the information may be parsed at step 1108. For example, blackout flags in the form of flag structure 1000 (FIG. 10) may be parsed and analyzed. If the video mosaic client determines that any objects in the video mosaic screen should be blacked out at step 1110, those objects may be blacked out at step 1112. For example, illustrative process 1500 (FIG. 15) may be invoked to blackout the object. The object may be masked, like cell 504 (FIG. 5). To determine if the blackout applies, video mosaic client 31 (FIG. 1) may compare the received blackout information to any information available on user equipment 30 (FIG. 1). For example, network addresses (e.g., the user equipment's network address or joined multicast addresses), local variables, controller identifiers, and local channel maps may be accessed and compared to the received blackout information.

The object's control data may also be redefined at step 1112 so that one or more new actions are associated with the blacked out object. For example, the object's control data may be redefined so that options overlay 802 (FIG. 8) is displayed after a user selects the blacked out object. The control data for the page may also be altered. For example, the user may not be allowed to select a blacked out object in a mosaic page in some embodiments. As described above, the video mosaic client may apply a new template to the mosaic page in order to overwrite existing control data with new control data for each blacked out object in the video mosaic page. The mosaic page with the blacked out calls is then presented to the user at step 1114.

In practice, one or more steps shown in process 1100 may be combined with other steps, performed in any suitable order, performed in parallel (e.g., simultaneously or substantially simultaneously) or removed.

Figure 12:
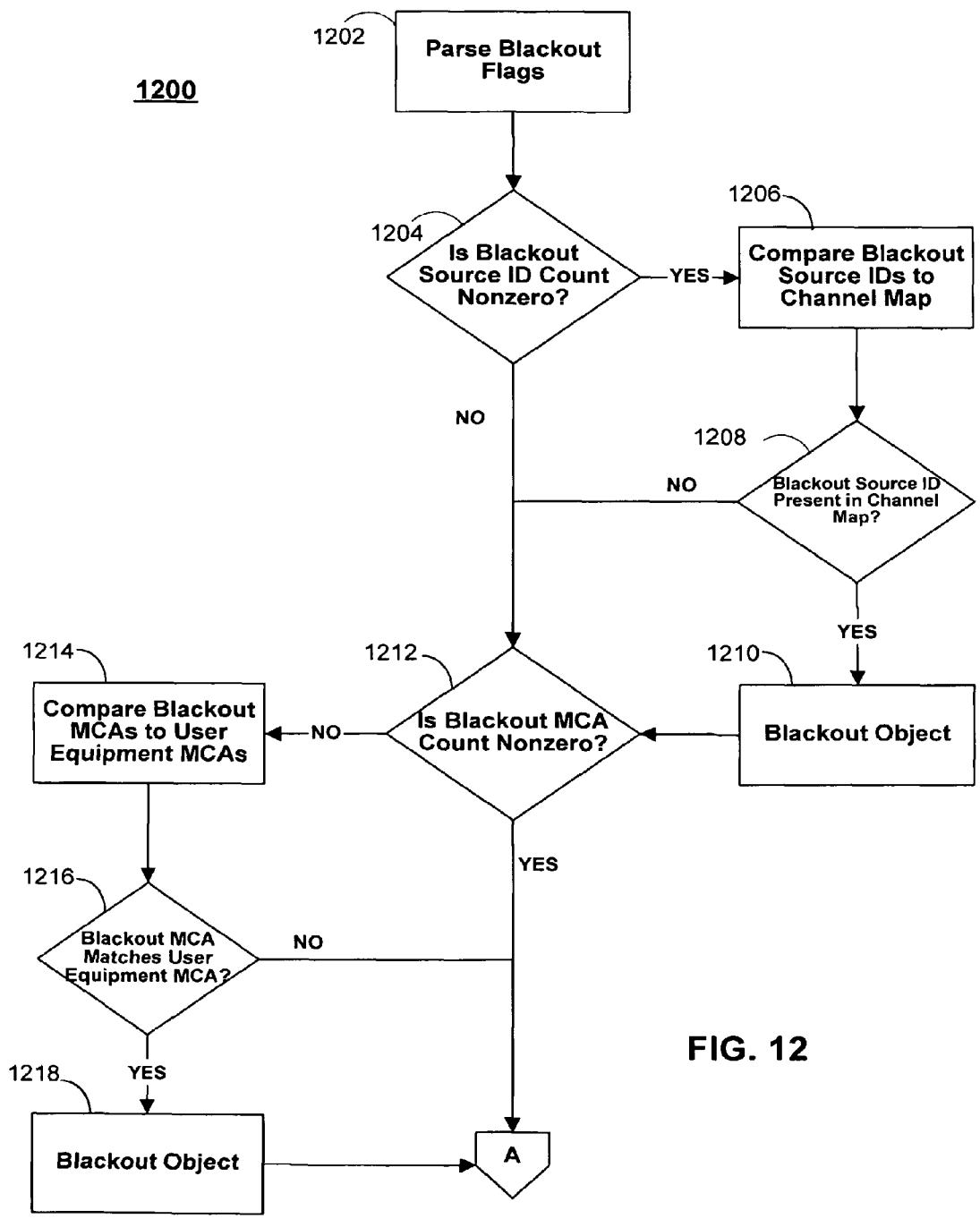
FIGS. 12-13 show an illustrative process for parsing blackout information in accordance with one embodiment of the present invention.
Figure 13:
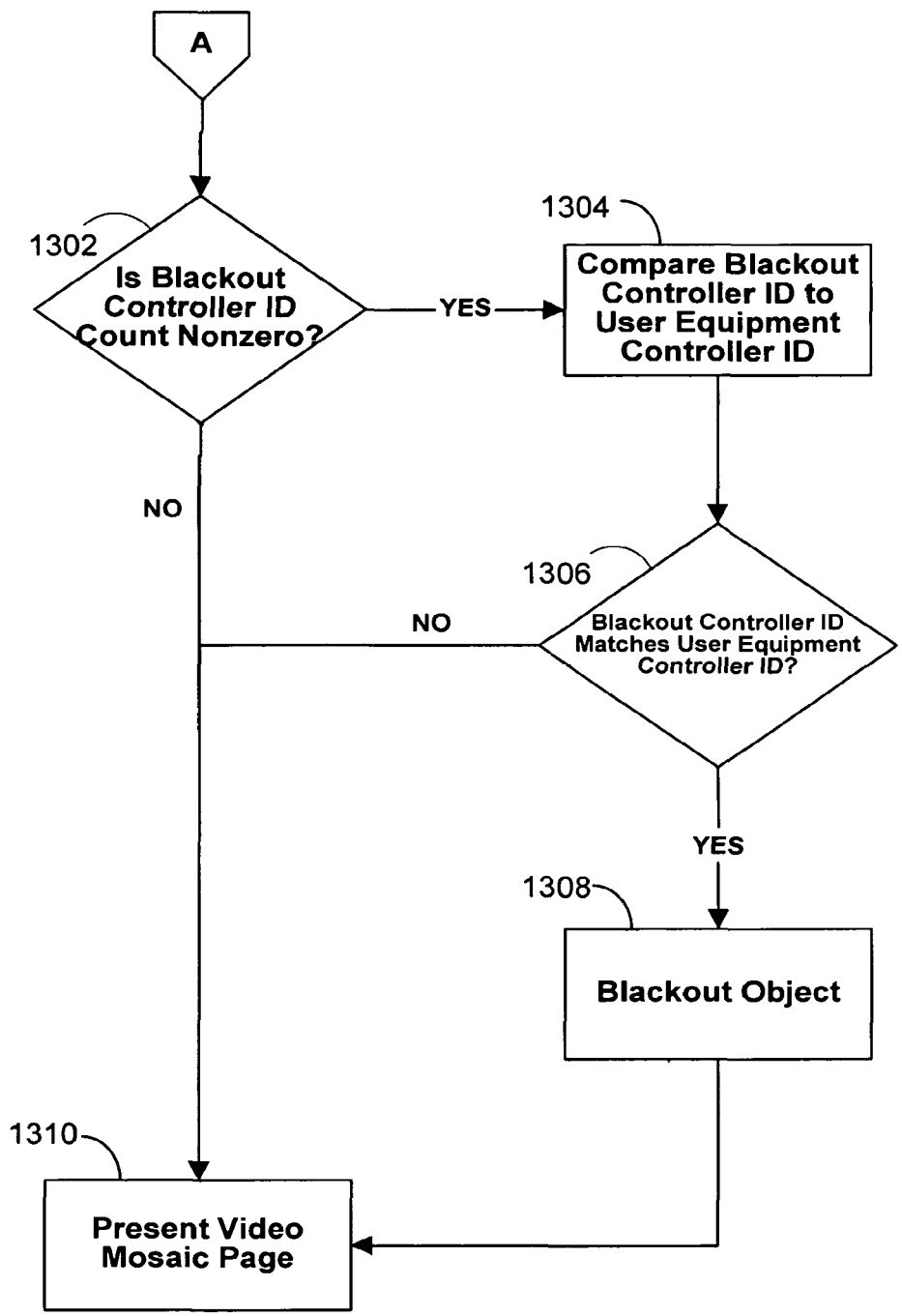

FIGS. 12 and 13 show illustrative process 1200 for parsing blackout flags in screen data associated with a video mosaic page. At step 1202, video mosaic client 31 (FIG. 1) may identify and parse a blackout flag structure. For example, if flags field 1002 of blackout flag structure 1000 (FIG. 10) has the "BO" flag set, the video mosaic client may parse a blackout flag structure containing one or more blackout source identifiers, one or more blackout MCAs, and/or one or more blackout controller identifiers. At step 1204, the video mosaic client determines if the blackout source identifier count is nonzero. For example, the value in field blackout source identifier count 1006 (FIG. 10) may be read at step 1204. If the field is nonzero, the blackout source identifiers are read and compared to the local channel map on the user equipment at 1206. At step 1208, the video mosaic client determines if at least one blackout source identifier read at step 1206 is present in the local channel map. If so, the object associated with the blackout flag may be blacked out at step 1210. For example, illustrative process 1500 (FIG. 15) may be invoked to blackout the object. The object's location on the mosaic screen may be masked, as shown in cell 504 (FIG. 5). The object's associated audio may also be blocked. In addition, control data associated with the object may be redefined. For example, a user may be restricted from highlighting or selecting a blacked out object. Alternatively, a user may select a blacked out object, but the action associated with the user selection may be redefined. For example, the user may be presented with blacked out options overlay 802 (FIG. 8) upon selecting a blacked out cell.

After the object associated with the blackout flag is blacked out at step 1210 or the mosaic client determines that either the blackout source identifier count is zero (step 1204) or the blackout source identifier is not present in the local channel map (step 1208), the video mosaic client may next determine if the blackout MCA count is nonzero at step 1212. In some embodiments, after determining that the object is to be blacked out for any reason (e.g., a source identifier in the blackout flag structure matches a source identifier in the local channel map), the mosaic client may stop looking at other blackout criteria. To determine if the blackout MCA count is nonzero, the value of blackout MCA count 1008 (FIG. 10) may be read. If the value is nonzero, the blackout MCA values may be read and compared to user equipment MCAs at step 1214. At step 1216, the video mosaic client may determine if any of the read blackout MCAs match a user equipment MCA. As described above, the user equipment may be associated with several MCAs. For example, the user equipment may be joined to an MCA for a local cable headend. If, at step 1216, one or more blackout MCAs are present on the user equipment, the object associated with the blackout flag may be blacked out at step 1218. For example, the object's location on the mosaic screen may be masked, as shown in cell 504 (FIG. 5). The object's associated audio may also be blocked. In addition, control data associated with the object may be redefined. For example, a user may be restricted from highlighting or selecting a blacked out object. Alternatively, a user may select a blacked out object, but the action associated with the user selection may be redefined. For example, the user may be presented with blacked out options overlay 802 (FIG. 8) upon selecting a blacked out cell.

After the object associated with the blackout flag is blacked out at step 1218 or the mosaic client determines that either the blackout MCA count is zero (step 1212) or the blackout MCA does not match a user equipment MCA (step 1216), illustrative process 1200 may continue in FIG. 13. At step 1302, the mosaic client next may determine if the blackout controller identifier count is nonzero at step 1302. For example, controller identifier count 1010 (FIG. 10) may be read. If the count is nonzero, one or more blackout controller identifiers may be read at step 1304 and compared to the user equipment controller identifier(s). At step 1306, the mosaic client may determine if one or more of the blackout controller identifiers read at step 1304 matches a user equipment controller identifier. The controller identifier may uniquely identify the controller within the cable operator's access control system that controls the user equipment. In some embodiments, a single user equipment may be controlled by more than one controller. For example, a primary controller and a backup controller may both control the user equipment. In these embodiments, if any one of the blackout controller identifiers matches any controller identifier on the user equipment, the mosaic client may blackout the object associated with the blackout flag at step 1308. In some embodiments, one or more subsets of user equipment associated with a controller may be specified, for example, with a list of channel map identifiers or cable plant identifiers. If present, the mosaic client may compare these values to the values associated with the local user equipment and blackout the object only if indicated by one of the identifiers. To blackout the object, the object's location on the mosaic screen may be masked, for example, as shown in cell 504 (FIG. 5). The object's associated audio may also be blocked. In addition, control data associated with the object may be redefined. For example, a user may be restricted from highlighting or selecting a blacked out object. Alternatively, a user may select a blacked out object, but the action associated with the user selection may be redefined. For example, the user may be presented with blacked out options overlay 802 (FIG. 8) upon selecting a blacked out cell.

After the object associated with the blackout flag is blacked out at step 1308 or the mosaic client determines that either the blackout controller identifier count is zero (step 1302) or the blackout controller identifier does not match a user equipment controller identifier (step 1306), the video mosaic page may be presented at step 1310. For example, mosaic display 300 (FIG. 3) may be presented to the user with one or more of the video mosaic cells blacked out.

In practice, one or more steps shown in process 1300 may be combined with other steps, performed in any suitable order, performed in parallel (e.g., simultaneously or substantially simultaneously) or removed.

Figure 14:
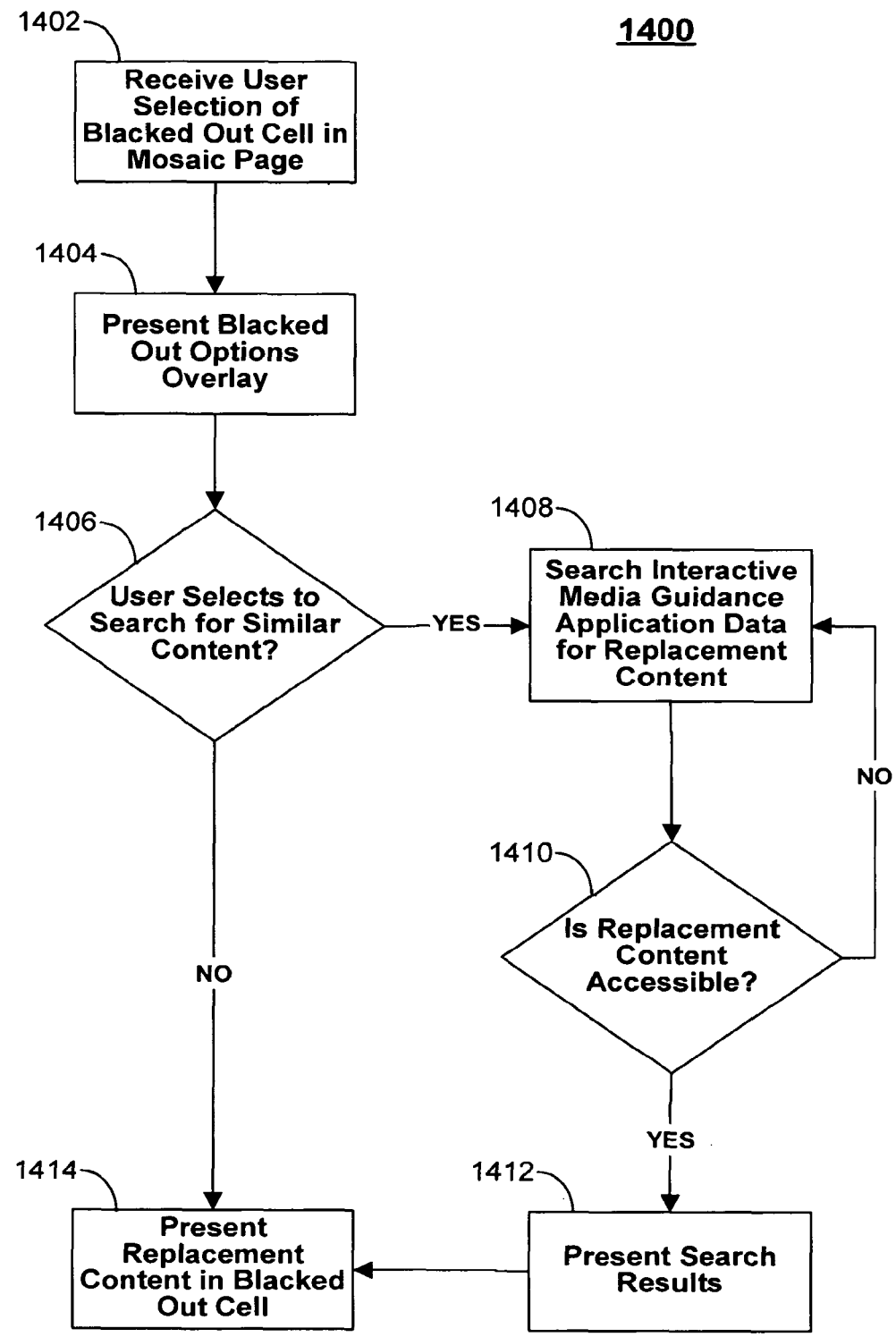
FIG. 14 shows an illustrative process for searching for assets similar to a blacked out cell in a video mosaic screen in accordance with one embodiment of the present invention.

FIG. 14 shows illustrative process 1400 for presenting blackout options to a user in response to the selection of a blacked out cell in a video mosaic page. At step 1402 a user selection of a blacked out object in a video mosaic page may be received. For example a user may use cursor keys on user input device 38 (FIG. 1) to highlight and select a blacked out cell, like cell 704 (FIG. 7). Upon selecting the cell, an options overlay may be presented to the user at step 1404. For example, blackout options overlay 802 (FIG. 8) may be displayed. The overlay may also include an indication of the blacked out object, such as the title, channel number, or any other identification information. From the overlay, the user may select to perform any suitable task relating to the blacked out object. For example, options overlay 802 (FIG. 8) provides the user with an opportunity to search for other assets similar to the blacked out asset, tune to replacement content, or receive more information about the blacked out object. If the user selects to search for assets similar to the blacked out asset at step 1406, interactive application data may be searched at step 1408. The interactive application data may include interactive media guidance application data, such as program listings and other program information.

The mosaic client may search for similar assets based on any suitable search criteria. For example, a search string may be automatically created containing the genre and title of the blacked out object. Other content in the same genre and similar to the blacked out title may be located, for example. At step 1410 the mosaic client may determine if the located content is currently accessible by the user equipment (or will become accessible within some user-specified period of time). For example, the content may be locked by parental controls or may itself be blacked out. The mosaic client may continue searching until a predetermined number of accessible similar assets are located or until the expiration of some search timeout value (e.g., 5 seconds). If any located content is accessible by the user equipment, a search results list is populated and presented to the user at step 1412 containing the located content. For example, search results overlay 902 (FIG. 9) may be presented to the user.

Upon selecting a search result at step 1412 or choosing not to search for similar assets, the video mosaic client may present replacement content in the blacked out cell at step 1414. For example, the content selected by the user at step 1412 may be presented in the blacked out cell. Alternatively, the mosaic client may automatically substitute the content in the blacked out cell with replacement content, as shown in cell 702 of FIG. 7. For example, locally stored graphics, advertising, or video may be displayed in the blacked out cell in lieu of the blacked out content. As described above, the replacement content may be substituted locally by the mosaic client or by hardware at the cable headend or distribution facility (e.g., distribution facility 20 of FIG. 1).

In practice, one or more steps shown in process 1400 may be combined with other steps, performed in any suitable order, performed in parallel (e.g., simultaneously or substantially simultaneously) or removed.

Figure 15:
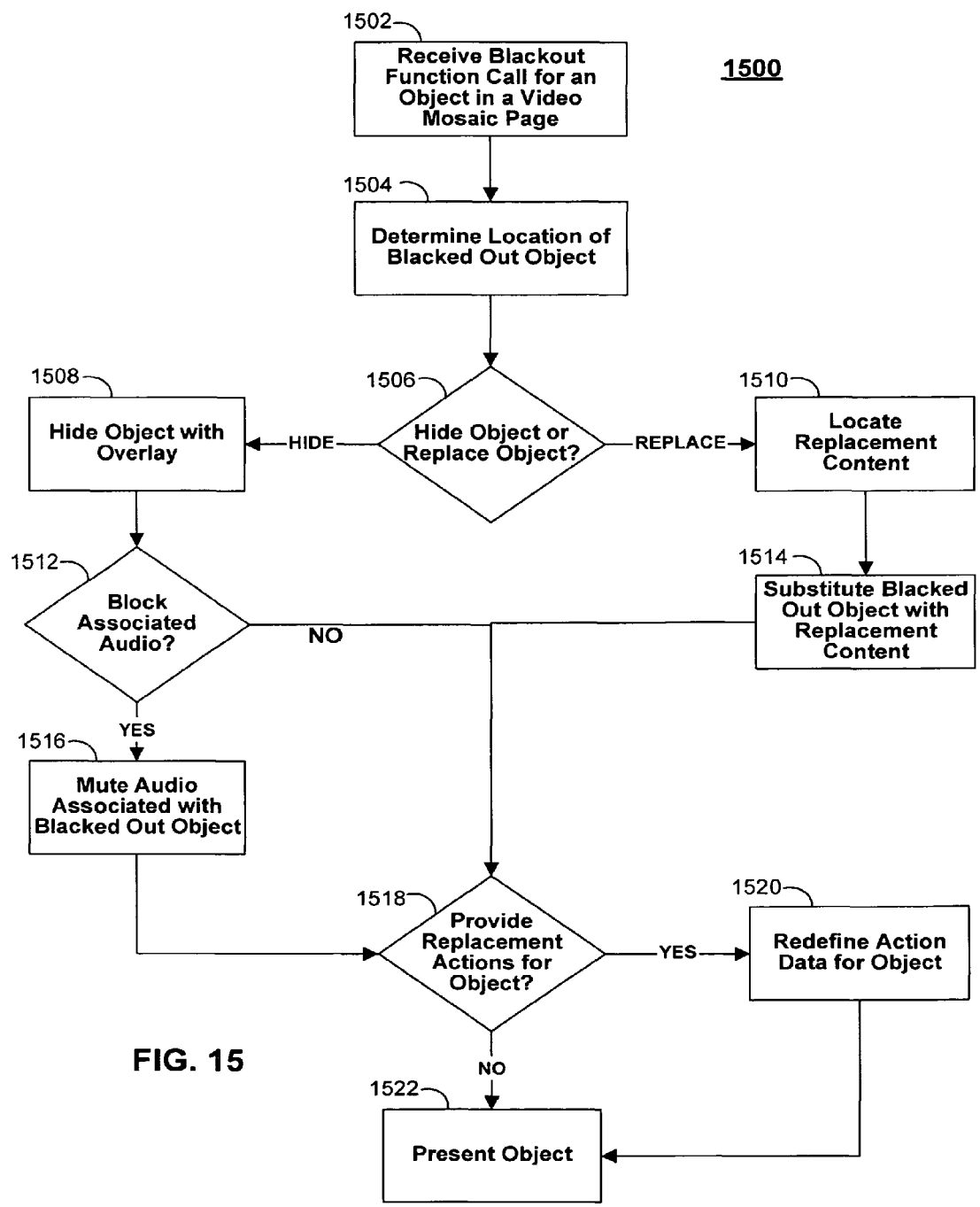
FIG. 15 shows an illustrative process for handling an object blackout function call in accordance with one embodiment of the present invention.

FIG. 15 shows illustrative process 1500 for blacking out an object in a video mosaic page. As described above, the video mosaic client may perform one or more of the following actions in connection with the video mosaic page: mask the location of the blacked out object in the mosaic page, block the object's associated audio, prevent the user from highlighting the blacked out object, redefine the action data associated with the blacked out object (e.g., the object's on-click action data), provide alternate, replacement media content for the blacked out object, or any suitable combination of these actions.

At step 1502, a blackout function call may be received. For example, an application or process external to the video mosaic client may generate a blackout request. At step 1504, the video mosaic client may determine the location of the object reference in the blackout request. For example, the object's x and y coordinates, size, and/or shape in the mosaic page may be read from screen data. At step 1506, the mosaic client determines if the object to be blacked out should be hidden or replaced. If the object is to be hidden, the mosaic client may hide the object with an overlay or other suitable cover at step 1508. For example, cell 504 (FIG. 5) shows an object hidden with an overlay containing a selectable icon and text.

Alternatively, the object may be removed from the page and optionally replaced with substitute content instead of using a cover or overlay. At step 1510 replacement content is located. For example, the video mosaic client may call one or more API function calls to interface with a media guidance application database to locate content similar to the content in the blacked out object. After locating suitable content at step 1510, the video mosaic client may replace the blacked out object with the substitute content at step 1514. The object's x and y coordinates, size, and/or shape in the mosaic page may be read from screen data and the newly located content may be presented at the location of the blacked out content.

After hiding a blacked out object with a cover or overlay at step 1508, the mosaic client determines if the object's associated audio should also be blocked at step 1512. For example, an MSO may be permitted to provide audio for a blacked out object (but not its video). If the audio should be blocked, at step 1516 the video mosaic client may also mute the object's associated audio. If the mosaic client determines that the audio should not be blocked at step 1512 (or if there is no associated audio) or after muting the audio at step 1516, the video mosaic client determines if replacement actions should be defines for the object at step 1518. For example, in some embodiments, blacked out objects may not be selected like other objects in the mosaic page. Rather, the cursor may skip blacked out objects, preventing them from being highlighted. If a blacked out object (or the replacement content) may be selected by the user, one or more additional actions may be defined or redefined in response to the user selection of the blacked out cell. The video mosaic client may redefine the control data associated with the blacked out object at step 1520. For example, the object's control data may be modified to present blacked out options overlay 802 in response to the user selection of a blacked out object. At step 1522, the blacked out process is complete and the object is presented to the user.

In practice, one or more steps shown in process 1500 may be combined with other steps, performed in any suitable order, performed in parallel (e.g., simultaneously or substantially simultaneously) or removed.

The above described embodiments of the present invention are presented for purposes of illustration and not of limitation, and the present invention is limited only by the claims which follow. For example, although this invention is described in conjunction with a remotely-composited mosaic of video cells, the advantages of this invention can be applied equally to other types of content on a composited screen, such as menu items, logos, text fields, and the like. This invention may also be applied to locally-composited screens or portions of screens.

What is claimed is:

1. A method for providing enhanced blackout support in a video mosaic screen presented on user equipment, the method comprising:
    generating for display the video mosaic screen including a plurality of video assets, wherein a first video asset is blacked out;
    receiving a user selection of a portion of the video mosaic screen corresponding to the first video asset that is blacked out;
    based on receiving the user selection of the portion corresponding to the first video asset that is blacked out:
        generating for display an options overlay for the first video asset including a recording option to record the first video asset; and
        receiving a user selection of the recording option in the options overlay;
    based on receiving the user selection of the recording option in the options overlay, initiating a recording of the first video asset;
    subsequent to initiating the recording of the first video asset, receiving a flag indicating that the first video asset is no longer blacked out on the user equipment; and
    in response to receiving the flag indicating that the first video asset is no longer blacked out on the user equipment, generating for display the video mosaic screen including the plurality of video assets, wherein the blacked out first video asset is replaced with the recording of the first video asset.

2. The method of claim 1, wherein receiving the flag indicating that the first video asset is no longer blacked out on the user equipment further comprises:
    determining a first location of the user equipment;
    determining, from blackout information for the first video asset, a second location for which the first video asset is blacked out; and
    determining that the first location is not included in the second location.

3. The method of claim 1, wherein receiving the flag indicating that the first video asset is no longer blacked out on the user equipment further comprises:
    determining a current time;
    determining, from blackout information for the first video asset, a blackout time for which the first video asset is blacked out; and
    determining that the current time is not included in the blackout time.

4. The method of claim 2, wherein receiving the flag indicating that the first video asset is no longer blacked out on the user equipment further comprises:
    updating the first location of the user equipment; and
    determining that the updated first location is not included in the second location.

5. The method of claim 1 wherein the video mosaic screen is generated remotely from the user equipment.

6. The method of claim 1 wherein the recording of the first video asset is performed remotely from the user equipment.

7. The method of claim 6, further comprising transferring the recording of the first video asset to the user equipment upon determining that the first video asset is no longer blacked out on the user equipment.

8. The method of claim 1, wherein generating for display the video mosaic screen further comprises generating for display a second video asset of the plurality of video assets that is not blacked out on the user equipment.

9. The method of claim 1, wherein the options overlay is a first options overlay, and further comprising:
receiving a first user selection of the recording of the first video asset from the video mosaic page;
generating for display a second options overlay in response to the first user selection;
receiving a user selection of an option in the second options overlay; and
generating for display information relating to the first video asset in response to the user selection of the option in the second options overlay.

10. The method of claim 1, wherein the options overlay is a first options overlay, and further comprising:
receiving a first user selection of the recording of the first video asset from the video mosaic page; and
generating for display a second options overlay simultaneously with a second video asset in response to the first user selection.

11. A system for providing enhanced blackout support in a video mosaic screen presented on user equipment, the system comprising:
storage circuitry configured to store information for a plurality of video assets;
control circuitry configured to:
generate for display the video mosaic screen including a plurality of video assets based on the stored information, wherein a first video asset is blacked out;
receive a user selection of a portion of the video mosaic screen corresponding to the first video asset that is blacked out;
based on receiving the user selection of the portion corresponding to the first video asset that is blacked out:
generate for display an options overlay for the first video asset including a recording option to record the first video asset; and
receive a user selection of the recording option in the options overlay;
based on receiving the user selection of the recording option in the options overlay, initiate a recording the first video asset;
subsequent to initiating the recording of the first video asset, receive a flag indicating that the first video asset is no longer blacked out on the user equipment; and
in response to receiving the flag indicating that the first video asset is no longer blacked out on the user equipment, generate for display the video mosaic screen including the plurality of video assets, wherein the blacked out first video asset is replaced with the recording of the first video asset.

12. The system of claim 11, wherein the control circuitry configured to receive the flag indicating that the first video asset is no longer blacked out on the user equipment comprises the control circuitry further configured to:
determine a first location of the user equipment;
determine, from blackout information for the first video asset, a second location for which the first video asset is blacked out; and
determine that the first location is not included in the second location.

13. The system of claim 11, wherein the control circuitry configured to receive the flag indicating that the first video asset is no longer blacked out on the user equipment comprises the control circuitry further configured to:
determine a current time;
determine, from blackout information for the first video asset, a blackout time for which the first video asset is blacked out; and
determine that the current time is not included in the blackout time.

14. The system of claim 12, wherein the control circuitry configured to receive the flag indicating that the first video asset is no longer blacked out on the user equipment comprises the control circuitry further configured to:
update the first location of the user equipment; and
determine that the updated first location is not included in the second location.

15. The system of claim 11 wherein the video mosaic screen is generated remotely from the user equipment.

16. The system of claim 11 wherein the recording of the first video asset is performed remotely from the user equipment.

17. The system of claim 16, wherein the control circuitry is further configured to transfer the recording of the first video asset to the user equipment upon determining that the first video asset is no longer blacked out on the user equipment.

18. The system of claim 11, wherein the control circuitry configured to generate for display the video mosaic screen comprises the control circuitry further configured to generate for display a second video asset of the plurality of video assets that is not blacked out on the user equipment.

19. The system of claim 11, wherein the options overlay is a first options overlay, and the control circuitry is further configured to:
receive a first user selection of the recording of the first video asset from the video mosaic page;
generate for display a second options overlay in response to the first user selection;
receive a user selection of an option in the second options overlay; and
generate for display information relating to the first video asset in response to the user selection of the option in the second options overlay.

20. The system of claim 11, wherein the options overlay is a first options overlay, and the control circuitry is further configured to:
receive a first user selection of the recording of the first video asset from the video mosaic page; and
generate for display a second options overlay simultaneously with a second video asset in response to the first user selection.

* * * * *